(12) United States Patent
Chen et al.

(10) Patent No.: US 12,124,108 B2
(45) Date of Patent: Oct. 22, 2024

(54) CAMERA LENS

(71) Applicant: ZHEJIANG SUNNY OPTICS CO., LTD., Yuyao (CN)

(72) Inventors: Chao Chen, Yuyao (CN); Yunbing Ji, Yuyao (CN); Fujian Dai, Yuyao (CN); Liefeng Zhao, Yuyao (CN)

(73) Assignee: ZHEJIANG SUNNY OPTICS CO., LTD., Yuyao (CN)

( * ) Notice: Subject to any disclaimer, the term of this patent is extended or adjusted under 35 U.S.C. 154(b) by 554 days.

(21) Appl. No.: 17/514,859

(22) Filed: Oct. 29, 2021

(65) Prior Publication Data

US 2022/0163776 A1    May 26, 2022

(30) Foreign Application Priority Data

Nov. 24, 2020 (CN) .......................... 202011330593.X

(51) Int. Cl.
*G02B 9/64* (2006.01)
*G02B 13/00* (2006.01)

(52) U.S. Cl.
CPC ........... *G02B 9/64* (2013.01); *G02B 13/0045* (2013.01)

(58) Field of Classification Search
None
See application file for complete search history.

(56) References Cited

U.S. PATENT DOCUMENTS

2019/0121100 A1* 4/2019 Song ...................... G02B 13/00
2020/0233186 A1* 7/2020 Lyu .................... G02B 13/0045

* cited by examiner

*Primary Examiner* — Stephone B Allen
*Assistant Examiner* — Tamara Y. Washington
(74) *Attorney, Agent, or Firm* — Birch, Stewart, Kolasch & Birch, LLP

(57) ABSTRACT

A camera lens is provided, including: a first lens having a positive refractive power; a second lens having a negative refractive power; a third lens; a fourth lens; a fifth lens; a sixth lens having a positive refractive power; and a seventh lens having a negative refractive power. A total effective focal length f of the camera lens, a half ImgH of a diagonal length of an effective pixel region on an imaging plane of the camera lens, and a distance TTL from an object side surface of the first lens to the imaging plane of the camera lens on the optical axis may satisfy: $ImgH^2/(TTL \times f) \geq 0.8$. The total effective focal length f, a radius of curvature R9 of an object side surface of the fifth lens and a radius of curvature R10 of an image side surface of the fifth lens may satisfy: $1.9 \leq f/R9 + f/R10 < 3.0$.

20 Claims, 14 Drawing Sheets

CAMERA LENS

CROSS-REFERENCE TO RELATED APPLICATIONS

The present application claims the priority of Chinese patent application No. 202011330593. X, filed on Nov. 24, 2020, which is hereby incorporated by reference in its entirety.

TECHNICAL FIELD

The present application relates to the field of optical elements, and more specifically, to a camera lens.

BACKGROUND

Smartphones have comprehensive functions, among which photography is a function that users attach great importance to. In order to better satisfy the user experience, the photographic performance of smartphones needs to be continuously improved. The continuous upgrade of the photosensitive chip and image processing software is required, and the performance of the camera lens on the mobile phone is also challenged.

At present, the camera lens on the mobile phone, especially the main camera lens of the multi-camera module, has a growing trend toward larger image plane and ultra-thin thickness. However, this development trend is a difficult challenge for the design of camera lenses. Compared with the existing camera lenses, the changes of these dominant value parameters can greatly improve the imaging capability and competitive advantage of the camera lenses.

The traditional camera lens has a small number of lenses, and such lens architecture is no longer sufficient to effectively cope with the needs of mobile phone manufacturers for camera lenses.

SUMMARY

The present application provides a camera lens, comprising, in order from an object side to an image side along an optical axis: a first lens having a positive refractive power; a second lens having a negative refractive power; a third lens; a fourth lens; a fifth lens; a sixth lens having a positive refractive power; and a seventh lens having a negative refractive power; wherein a total effective focal length f of the camera lens, a half ImgH of a diagonal length of an effective pixel region on an imaging plane of the camera lens, and a distance TTL from an object side surface of the first lens to the imaging plane of the camera lens on the optical axis may satisfy: $ImgH^2/(TTL \times f) \geq 0.8$; and the total effective focal length f of the camera lens, a radius of curvature R9 of an object side surface of the fifth lens and a radius of curvature R10 of an image side surface of the fifth lens may satisfy: $1.9 \leq f/R9 + f/R10 < 3.0$.

In one implementation, there is at least one aspherical lens surface from the object side surface of the first lens to an image side surface of the seventh lens.

In one implementation, an effective focal length f6 of the sixth lens, a radius of curvature R11 of an object side surface of the sixth lens, and a radius of curvature R12 of an image side surface of the sixth lens may satisfy: $-0.5 < f6/(R11+R12) \leq 0.1$.

In one implementation, an effective focal length f7 of the seventh lens, a radius of curvature R13 of an object side surface of the seventh lens, and a radius of curvature R14 of an image side surface of the seventh lens may satisfy: $-1.5 \leq f7/(R13+R14) < -1.0$.

In one implementation, the total effective focal length f of the camera lens, a radius of curvature R1 of the object side surface of the first lens and a radius of curvature R4 of an image side surface of the second lens may satisfy: $0.5 < f/R1 - f/R4 < 1.5$.

In one implementation, a combined focal length f12 of the first lens and the second lens, a radius of curvature R2 of an image side surface of the first lens, and a radius of curvature R3 of an object side surface of the second lens may satisfy: $1.8 \leq f12/|R2-R3| < 4.0$.

In one implementation, the total effective focal length f of the camera lens, an effective focal length f1 of the first lens, and an effective focal length f2 of the second lens may satisfy: $-2.0 < f/(f1+f2) \leq -0.8$.

In one implementation, an effective focal length f5 of the fifth lens and an effective focal length f7 of the seventh lens may satisfy: $3 \leq f5/f7 < 15$.

In one implementation, the total effective focal length f of the camera lens and an effective focal length f1 of the first lens may satisfy: $1 \leq f/f1 \leq 1.3$.

In one implementation, the total effective focal length f of the camera lens and an effective focal length f6 of the sixth lens may satisfy: $0.8 \leq f/f6 \leq 1.0$.

In one implementation, the total effective focal length f of the camera lens, an effective focal length f6 of the sixth lens, and an effective focal length f7 of the seventh lens may satisfy: $2 \leq f/f6 - f/f7 < 2.5$.

In one implementation, a separation distance T34 between the third lens and the fourth lens on the optical axis, and a separation distance T45 between the fourth lens and the fifth lens on the optical axis may satisfy: $1.8 \leq (T34+T45)/T34 < 3.0$.

In one implementation, a radius of curvature R11 of an object side surface of the sixth lens, a radius of curvature R13 of an object side surface of the seventh lens, and a radius of curvature R14 of an image side surface of the seventh lens may satisfy: $0.9 \leq (R11-R13)/R14 < 1.2$.

In one implementation, a radius of curvature R13 of an object side surface of the seventh lens, and a separation distance T67 between the sixth lens and the seventh lens on the optical axis may satisfy: $-4.5 < R13/T67 < -3.0$.

In one implementation, a center thickness CT5 of the fifth lens on the optical axis, a center thickness CT6 of the sixth lens on the optical axis, and a center thickness CT7 of the seventh lens on the optical axis may satisfy: $0.9 \leq (CT6-CT5)/(CT6-CT7) < 2.0$.

In one implementation, an on-axis distance SAG71 from an intersection point of an object side surface of the seventh lens and the optical axis to a vertex of the maximum effective radius of the object side surface of the seventh lens, a separation distance T67 between the sixth lens and the seventh lens on the optical axis, and a center thickness CT6 of the sixth lens on the optical axis may satisfy: $-1.0 \leq (SAG71+T67)/CT6 \leq -0.5$.

In one implementation, a distance TTL from the object side surface of the first lens to an imaging plane of the camera lens on the optical axis and a half ImgH of a diagonal length of an effective pixel region on the imaging plane may satisfy: $TTL/ImgH < 1.3$.

Another aspect of the present application provides a camera lens, comprising, in order from an object side to an image side along an optical axis: a first lens having a positive refractive power; a second lens having a negative refractive power; a third lens; a fourth lens; a fifth lens; a sixth lens having a positive refractive power; and a seventh lens having a negative refractive power; wherein a total effective focal length f of the camera lens, a half ImgH of a diagonal length of an effective pixel region on an imaging plane of the camera lens, and a distance TTL from an object side surface of the first lens to the imaging plane of the camera lens on the optical axis may satisfy: $ImgH^2/(TTL \times f) \geq 0.8$; and an effective focal length f7 of the seventh lens, a radius of curvature R13 of an object side surface of the seventh lens, and a radius of curvature R14 of an image side surface of the seventh lens may satisfy: $-1.5 \leq f7/(R13+R14) < -1.0$.

In one implementation, an effective focal length f6 of the sixth lens, a radius of curvature R11 of an object side surface of the sixth lens, and a radius of curvature R12 of an image side surface of the sixth lens may satisfy: $-0.5 < f6/(R11+R12) \leq 0.1$.

In one implementation, the total effective focal length f of the camera lens, a radius of curvature R9 of an object side surface of the fifth lens and a radius of curvature R10 of an image side surface of the fifth lens may satisfy: $1.9 \leq f/R9 + f/R10 < 3.0$.

In one implementation, the total effective focal length f of the camera lens, a radius of curvature R1 of the object side surface of the first lens and a radius of curvature R4 of an image side surface of the second lens may satisfy: $0.5 < f/R1 - f/R4 < 1.5$.

In one implementation, a combined focal length f12 of the first lens and the second lens, a radius of curvature R2 of an image side surface of the first lens, and a radius of curvature R3 of an object side surface of the second lens may satisfy: $1.8 \leq f12/|R2-R3| < 4.0$.

In one implementation, the total effective focal length f of the camera lens, an effective focal length f1 of the first lens, and an effective focal length f2 of the second lens may satisfy: $-2.0 < f/(f1+f2) \leq -0.8$.

In one implementation, an effective focal length f5 of the fifth lens and an effective focal length f7 of the seventh lens may satisfy: $3 \leq f5/f7 < 15$.

In one implementation, the total effective focal length f of the camera lens and an effective focal length f1 of the first lens may satisfy: $1 \leq f/f1 \leq 1.3$.

In one implementation, the total effective focal length f of the camera lens and an effective focal length f6 of the sixth lens may satisfy: $0.8 \leq f/f6 \leq 1.0$.

In one implementation, the total effective focal length f of the camera lens, an effective focal length f6 of the sixth lens, and an effective focal length f7 of the seventh lens may satisfy: $2 \leq f/f6 - f/f7 < 2.5$.

In one implementation, a separation distance T34 between the third lens and the fourth lens on the optical axis, and a separation distance T45 between the fourth lens and the fifth lens on the optical axis may satisfy: $1.8 \leq (T34+T45)/T34 < 3.0$.

In one implementation, a radius of curvature R11 of an object side surface of the sixth lens, a radius of curvature R13 of an object side surface of the seventh lens, and a radius of curvature R14 of an image side surface of the seventh lens may satisfy: $0.9 \leq (R11-R13)/R14 < 1.2$.

In one implementation, a radius of curvature R13 of an object side surface of the seventh lens, and a separation distance T67 between the sixth lens and the seventh lens on the optical axis may satisfy: $-4.5 < R13/T67 < -3.0$.

In one implementation, a center thickness CT5 of the fifth lens on the optical axis, a center thickness CT6 of the sixth lens on the optical axis, and a center thickness CT7 of the seventh lens on the optical axis may satisfy: $0.9 \leq (CT6-CT5)/(CT6-CT7) < 2.0$.

In one implementation, an on-axis distance SAG71 from an intersection point of an object side surface of the seventh lens and the optical axis to a vertex of the maximum effective radius of the object side surface of the seventh lens, a separation distance T67 between the sixth lens and the seventh lens on the optical axis, and a center thickness CT6 of the sixth lens on the optical axis may satisfy: $-1.0 \leq (SAG71+T67)/CT6 \leq -0.5$.

In one implementation, a distance TTL from the object side surface of the first lens to an imaging plane of the camera lens on the optical axis and a half ImgH of a diagonal length of an effective pixel region on the imaging plane may satisfy: $TTL/ImgH < 1.3$.

In the present application, seven lenses are adopted, and the refractive power, surface shape and center thickness of each lens, the on-axis distances between the respective lenses, and the like are reasonably distributed, so that the above-mentioned camera lens has at least one beneficial effect of ultra-thin thickness, large image plane, low distortion, good image quality and so on.

BRIEF DESCRIPTION OF THE DRAWINGS

Other features, objectives, and advantages of the present application will become more apparent by reading a detailed description of non-restrictive embodiments made with reference to the following drawings. In the drawings.

DETAILED DESCRIPTION

Figure 1:
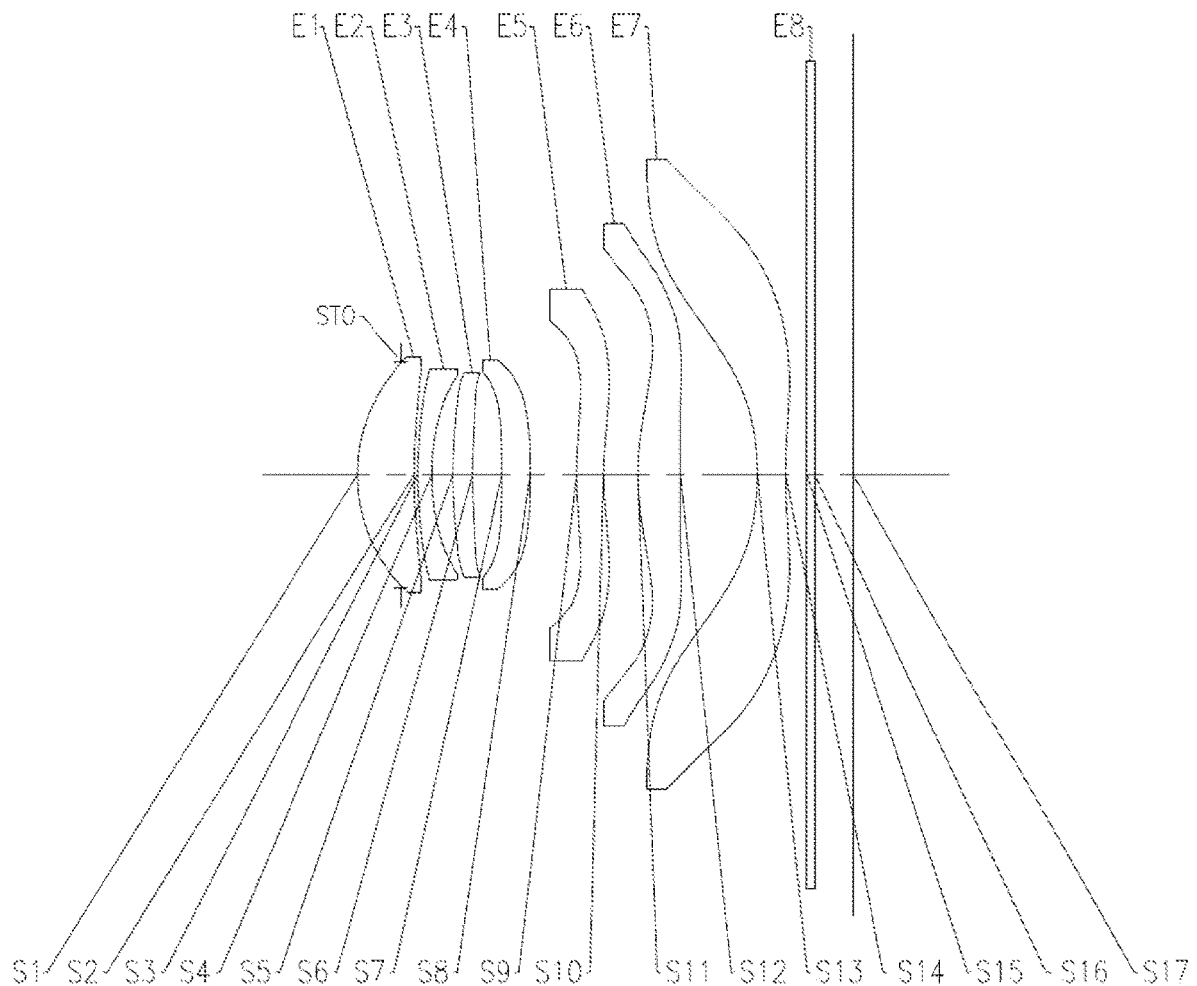
FIG. 1 shows a schematic structural diagram of a camera lens according to Embodiment 1 of the present application.

In order to better understand the present application, various aspects of the present application will be described in more detail with reference to the drawings. It should be understood that the detailed description is merely description of exemplary implementations of the present application, and does not limit the scope of the present application in any way. Throughout the description, the same reference numerals refer to the same elements. The expression "and/or" includes any and all combinations of one or more of the associated listed items.

It should be noted that in the present description, the expressions of "first", "second", "third" etc. are only used to distinguish one feature from another feature, and do not indicate any limitation on the feature. Therefore, without departing from the teachings of the present application, a first lens discussed below may also be referred to as a second lens or a third lens.

In the drawings, for convenience of explanation, the thickness, size, and shape of the lens have been slightly exaggerated. Specifically, the shapes of spherical or aspherical surfaces shown in the drawings are shown by way of example. That is, the shapes of the spherical or aspheric surfaces are not limited to those shown in the drawings. The drawings are only examples and are not drawn strictly to scale.

Herein, a paraxial region refers to a region near an optical axis. If a lens surface is convex and the position of the convex surface is not defined, then it means that the lens surface is convex at least in the paraxial region; and if the lens surface is concave and the position of the concave surface is not defined, then it means that the lens surface is concave at least in the paraxial region. A surface of each lens closest to a subject (=an object to be captured) is referred as an object side surface of the lens, and a surface of each lens closest to an imaging plane is referred as an image side surface of the lens.

It should also be understood that the terms "comprising", "comprise", "having", "including" and/or "include" when used in the present description, indicate the existence of stated features, elements and/or components, but does not exclude the presence or addition of one or more other features, elements, components and/or combinations thereof. Furthermore, when an expression such as "at least one of" appears before the list of listed features, it modifies the entire list of listed features, rather than the individual elements in the list. In addition, when describing the implementations of the present application, the use of "may" means "one or more implementations of the present application", and, the term "exemplary" refers to an example or illustration.

Unless otherwise defined, all terms (including technical and scientific terms) used herein have the same meanings as commonly understood by those of ordinary skill in the art to which the present application belongs. It should also be understood that the terms (such as those defined in commonly used dictionaries) should be interpreted to have meanings consistent with their meaning in the context of the relevant art and will not be interpreted in an idealized or overly formal sense unless it is clearly defined herein.

It needs to be explained that, in the case of no conflict, the embodiments in the present application and the features in the embodiments can be combined with each other. The present application will be described in detail below in conjunction with embodiments with reference to the drawings.

The features, principles and other aspects of the present application will be described in detail below.

A camera lens according to an exemplary implementation of the present application may include, for example, seven lenses having refractive powers, i.e., a first lens, a second lens, a third lens, a fourth lens, a fifth lens, a sixth lens and a seventh lens. The seven lenses are arranged in order from an object side to an image side along an optical axis. There may be an air gap between any two adjacent lenses of the first to seventh lenses.

In an exemplary implementation, the first lens may have a positive refractive power; the second lens may have a negative refractive power; the third lens has a positive refractive power or a negative refractive power; the fourth lens has a positive refractive power or a negative refractive power; the fifth lens has a positive refractive power or a negative refractive power; the sixth lens may have a positive refractive power; and the seventh lens may have a negative refractive power. The positive and negative distribution of the refractive power, and the lens surface shape and curvature of each component of the lens assembly are reasonably controlled to effectively balance and control the low-order aberration of the lens assembly.

In an exemplary implementation, the camera lens of the present application may satisfy a conditional expression of $ImgH^2/(TTL \times f) \geq 0.8$, where f is a total effective focal length of the camera lens, ImgH is a half of a diagonal length of an effective pixel region on an imaging plane of the camera lens, and TTL is a distance from an object side surface of the first lens to the imaging plane of the camera lens on the optical axis. The camera lens satisfies the conditional expression of $ImgH^2/(TTL \times f) \geq 0.8$, which can ensure the characteristics that the camera lens is light and thin. More specifically, f, ImgH, and TTL may satisfy: $0.80 \leq ImgH^2/(TTL \times f) \leq 0.94$.

In an exemplary implementation, the camera lens of the present application may satisfy a conditional expression of $1.9 \leq f/R9 + f/R10 < 3.0$, where f is the total effective focal length of the camera lens, R9 is a radius of curvature of an object side surface of the fifth lens, and R10 is a radius of curvature of an image side surface of the fifth lens. The camera lens satisfies the conditional expression of $1.9 \leq f/R9 + f/R10 < 3.0$, which can reduce its optical distortion. Exemplarily, the camera lens satisfies the conditional expression of $ImgH^2/(TTL \times f) \geq 0.8$ at the same time, so that the camera lens has better imaging quality. More specifically, f, R9, and R10 may satisfy: $1.92 \leq f/R9 + f/R10 < 2.80$.

In an exemplary implementation, the camera lens of the present application may satisfy a conditional expression of $-0.5 < f6/(R11+R12) \leq 0.1$, where f6 is an effective focal length of the sixth lens, R11 is a radius of curvature of an object side surface of the sixth lens, and R12 is a radius of curvature of an image side surface of the sixth lens. The camera lens satisfies the conditional expression of $-0.5 < f6/(R11+R12) \leq 0.1$, which can reduce its optical distortion, thereby ensuring its good imaging quality. More specifically, f6, R11, and R12 may satisfy: $-0.27 < f6/(R11+R12) \leq 0.10$.

In an exemplary implementation, the camera lens of the present application may satisfy a conditional expression of $-1.5 \leq f7/(R13+R14) < -1.0$, where f7 is an effective focal length of the seventh lens, R13 is a radius of curvature of an object side surface of the seventh lens, and R14 is a radius of curvature of an image side surface of the seventh lens.

The camera lens satisfies the conditional expression of $-1.5 \leq f7/(R13+R14) < -1.0$, which can reduce its optical distortion, thereby ensuring its good imaging quality. More specifically, f7, R13, and R14 may satisfy: $-1.50 \leq f7/(R13+R14) < -1.05$.

In an exemplary implementation, the camera lens of the present application may satisfy a conditional expression of $0.5 < f/R1 - f/R4 < 1.5$, where f is the total effective focal length of the camera lens, R1 is a radius of curvature of an object side surface of the first lens, and R4 is a radius of curvature of an image side surface of the second lens. The camera lens satisfies a conditional expression of $0.5 < f/R1 - f/R4 < 1.5$, which can reduce its optical distortion, thereby ensuring its good imaging quality. More specifically, f, R1, and R4 may satisfy: $0.55 < f/R1 - f/R4 < 1.33$.

In an exemplary implementation, the camera lens of the present application may satisfy a conditional expression of $1.8 \leq f12/|R2-R3| < 4.0$, where f12 is a combined focal length of the first lens and the second lens, R2 is a radius of curvature of an image side surface of the first lens, and R3 is a radius of curvature of an object side surface of the second lens. The camera lens satisfies the conditional expression of $1.8 \leq f12/51\ R2-R3| < 4.0$, which is advantageous to control the incident angle of the light from the off-axis field of view on the imaging plane, and thereby can increase the matching of the camera lens and the photosensitive element and the matching of the camera lens and the bandpass filter. More specifically, f12, R2, and R3 may satisfy: $1.80 \leq f12/|R2-R3| < 3.85$.

In an exemplary implementation, the camera lens of the present application may satisfy a conditional expression of $-2.0 < f/(f1+f2) \leq -0.8$, where f is the total effective focal length of the camera lens, f1 is an effective focal length of the first lens, and f2 is an effective focal length of the second lens. The camera lens satisfies the conditional expression of $-2.0 < f/(f1+f2) \leq -0.8$, which can reasonably distribute the refractive power of the camera lens and effectively improve the aberration of the camera lens. More specifically, f, f1, and f2 may satisfy: $-1.75 < f/(f1+f2) \leq -0.80$.

In an exemplary implementation, the camera lens of the present application may satisfy a conditional expression of $3 \leq f5/f7 < 15$, where f5 is an effective focal length of the fifth lens, and f7 is an effective focal length of the seventh lens. The camera lens satisfies the conditional expression of $3 \leq f5/f7 < 15$, which can effectively reduce the optical sensitivity of the fifth lens and the seventh lens, and thereby is more advantageous for mass production of the camera lens. More specifically, f5 and f7 may satisfy: $3.00 \leq f5/f7 < 14.40$.

In an exemplary implementation, the camera lens of the present application may satisfy a conditional expression of $1 \leq f/f1 \leq 1.3$, where f is the total effective focal length of the camera lens, and f1 is the effective focal length of the first lens. The camera lens satisfies $1 \leq f/f1 \leq 1.3$, which is helpful to improve its chromatic aberration, and can also adjust the focus position of the light and enhance the ability of the camera lens to converge the light.

In an exemplary implementation, the camera lens of the present application may satisfy a conditional expression of $0.8 \leq f/f6 \leq 1.0$, where f is a total effective focal length of the camera lens, and f6 is an effective focal length of the sixth lens. The camera lens satisfies $0.8 \leq f/f6 \leq 1.0$, which is helpful to increase the focal length of the camera lens, and can adjust the position of the light, thereby shortening the total length of the camera lens.

In an exemplary implementation, the camera lens of the present application may satisfy a conditional expression of $2 \leq f/f6 - f/f7 < 2.5$, where f is the total effective focal length of the camera lens, f6 is the effective focal length of the sixth lens, and f7 is the effective focal length of the seventh lens. The camera lens satisfies $2 \leq f/f6 - f/f7 < 2.5$, which is advantageous to better balance the aberration of the camera lens, and at the same time, is advantageous to improve the resolution of the camera lens. More specifically, f, f6, and f7 may satisfy: $2.02 \leq f/f6 - f/f7 < 2.35$.

In an exemplary implementation, the camera lens of the present application may satisfy a conditional expression of $1.8 \leq (T34+T45)/T34 < 3.0$, where T34 is a separation distance between the third lens and the fourth lens on the optical axis, and T45 is a separation distance between the fourth lens and the fifth lens on the optical axis. The camera lens satisfies $1.8 \leq (T34+T45)/T34 < 3.0$, which can effectively control the rear-end size of the camera lens, and thereby can avoid the size of the camera lens being too large. More specifically, T34 and T45 may satisfy: $1.80 \leq (T34+T45)/T34 < 2.90$.

In an exemplary implementation, the camera lens of the present application may satisfy a conditional expression of $0.9 \leq (R11-R13)/R14 < 1.2$, where R11 is a radius of curvature of an object side surface of the sixth lens, R13 is a radius of curvature of an object side surface of the seventh lens, and R14 is a radius of curvature of an image side surface of the seventh lens. The camera lens satisfies $0.9 \leq (R11-R13)/R14 < 1.2$, which can avoid the sixth lens and the seventh lens being too curved, and reduce the machining difficulty of the two lenses while making the camera lens have a better ability to balance chromatic aberration and distortion. More specifically, R11, R13, and R14 may satisfy: $0.94 \leq (R11-R13)/R14 < 1.10$.

In an exemplary implementation, the camera lens of the present application may satisfy a conditional expression of $-4.5 < R13/T67 < -3.0$, where R13 is a radius of curvature of the object side surface of the seventh lens, and T67 is a separation distance between the sixth lens and the seventh lens on the optical axis. The camera lens satisfies $-4.5 < R13/T67 < -3.0$, which can adjust the angle of the principal ray of the camera lens, and then can effectively increase the relative brightness of the camera lens and enhance the sharpness of the imaging plane. More specifically, R13 and T67 may satisfy: $-4.10 < R13/T67 < -3.15$.

In an exemplary implementation, the camera lens of the present application may satisfy a conditional expression of $0.9 \leq (CT6-CT5)/(CT6-CT7) < 2.0$, where CT5 is a center thickness of the fifth lens on the optical axis, CT6 is a center thickness of the fifth lens on the optical axis, and CT7 is a center thickness of the seventh lens on the optical axis. The camera lens satisfies $0.9 \leq (CT6-CT5)/(CT6-CT7) < 2.0$, which can effectively reduce the size of the camera lens to avoid the volume of the camera lens being too large, and can also reduce the assembly difficulty of lens while achieving a higher space utilization rate. More specifically, CT5, CT6 and CT7 may satisfy: $0.90 \leq (CT6-CT5)/(CT6-CT7) < 1.90$.

In an exemplary implementation, the camera lens of the present application may satisfy a conditional expression of $-1.0 \leq (SAG71+T67)/CT6 \leq -0.5$, where SAG71 is an on-axis distance from an intersection point of the object side surface of the seventh lens and the optical axis to a vertex of the maximum effective radius of the object side surface of the seventh lens, T67 is a separation distance between the sixth lens and the seventh lens on the optical axis, and CT6 is the center thickness of the sixth lens on the optical axis. The camera lens satisfies $-1.0 \leq (SAG71+T67)/CT6 \leq -0.5$, which can reasonably control the deflection angle of the principal ray and improve the matching degree with the chip, and is advantageous to adjust the structure of the camera lens.

More specifically, SAG71, T67 and CT6 may satisfy: $-0.95 \leq (SAG71+T67)/CT6 \leq -0.50$.

In an exemplary implementation, the camera lens of the present application may satisfy a conditional expression of TTL/ImgH<1.3, where TTL is a distance from the object side surface of the first lens to the imaging plane of the camera lens on the optical axis, and ImgH is a half of the diagonal length of the effective pixel region on the imaging plane of the camera lens. The ratio of the total optical length of the camera lens to its image height is within this range, so that the field of view can be controlled within a certain range, and the refraction of the incident light at the first lens is more moderate, which can thus prevent the aberration of the camera lens from excessively increasing and is helpful to improve the image quality of the camera lens. More specifically, TTL and ImgH can satisfy: 1.10<TTL/ImgH<1.25.

In an exemplary implementation, the aforementioned camera lens may further include at least one diaphragm. The diaphragm can be set at an appropriate position as needed, for example, between the object side and the first lens. Optionally, the aforementioned camera lens may further include a filter for correcting color deviation and/or a protective glass for protecting a photosensitive element located on the imaging plane.

The camera lens according to the aforementioned implementations of the present application may adopt multiple lens pieces, for example, seven pieces as described above. The space utilization rate of the camera lens is high, and the lens assembly structure can adapt to higher dominant value parameter requirements. The refractive power, surface shape and center thickness of each lens, the on-axis distances between the respective lenses, and the like are reasonably distributed, which can effectively reduce the volume of the camera lens, reduce the sensitivity of the camera lens, and improve the machinability of the camera lens, so that the camera lens is more advantageous for production and machining and is applicable for portable electronic products. At the same time, the camera lens of the present application also has excellent optical performance of ultra-thin thickness, large image plane, small distortion, good image quality and so on.

In the implementations of the present application, at least one of lens surfaces of the respective lenses is an aspherical lens surface, that is, at least one lens surface of the object side surface of the first lens to the image side surface of the seventh lens is an aspherical lens surface. An aspherical lens is characterized in that the curvature changes continuously from the center of the lens to the periphery of the lens. Unlike a spherical lens having a constant curvature from the center of the lens to the periphery of the lens, the aspherical lens has better radius-of-curvature properties, and has the advantages of improving distortion aberration and improving astigmatism aberration. After the aspherical lens is adopted, the aberrations that occur during imaging can be eliminated as much as possible, thereby improving the imaging quality. Optionally, at least one of an object side surface and an image side surface of each of the first lens, the second lens, the third lens, the fourth lens, the fifth lens, the sixth lens and the seventh lens is an aspherical lens surface. Optionally, both an object side surface and an image side surface of each of the first lens, the second lens, the third lens, the fourth lens, the fifth lens, the sixth lens and the seventh lens are aspherical lens surfaces.

However, it should be understood by those skilled in the art that the number of lenses constituting the camera lens can be changed without departing from the technical solution claimed in the present application, to obtain respective results and advantages described in the description. For example, although seven lenses have been described in the implementations as an example, the camera lens is not limited to including the seven lenses. If necessary, the camera lens may also include other numbers of lenses.

Specific embodiments of the camera lens applicable to the aforementioned implementations will be further described below with reference to the drawings.

Embodiment 1

A camera lens according to Embodiment 1 of the present application will be described below with reference to FIGS. 1 to 2D. FIG. 1 shows a schematic structural diagram of the camera lens according to Embodiment 1 of the present application.

As shown in FIG. 1, the camera lens includes a diaphragm STO, a first lens E1, a second lens E2, a third lens E3, a fourth lens E4, a fifth lens E5, a sixth lens E6, a seventh lens E7, and a filter E8 in order from an object side to an image side along an optical axis.

The first lens E1 has a positive refractive power, and has a convex object side surface S1 and a concave image side surface S2. The second lens E2 has a negative refractive power, and has a convex object side surface S3 and a concave image side surface S4. The third lens E3 has a positive refractive power, and has a convex object side surface S5 and a concave image side surface S6. The fourth lens E4 has a positive refractive power, and has a concave object side surface S7 and a convex image side surface S8. The fifth lens E5 has a negative refractive power, and has a convex object side surface S9 and a concave image side surface S10. The sixth lens E6 has a positive refractive power, and has a convex object side surface S11 and a convex image side surface S12. The seventh lens E7 has a negative refractive power, and has a concave object side surface S13 and a concave image side surface S14. The filter E8 has an object side surface S15 and an image side surface S16. The camera lens has an imaging plane S17. Light from an object sequentially passes through the respective surfaces S1 to S16 and finally forms an image on the imaging plane S17.

Table 1 shows a table of basic parameters of the camera lens of Embodiment 1, wherein the units of the radius of curvature, thickness/distance, and focal length are all millimeters (mm).

TABLE 1

| Surface No. | Surface type | Radius of curvature | Thickness/ distance | Material | | Focal length | Conic coefficient |
| | | | | Refractive index | Dispersion coefficient | | |
| --- | --- | --- | --- | --- | --- | --- | --- |
| OBJ | Spherical | Infinity | Infinity | | | | |
| STO | Spherical | Infinity | −0.6200 | | | | |
| S1 | Aspherical | 2.3489 | 0.8129 | 1.546 | 56.14 | 5.45 | −0.0535 |

TABLE 1-continued

| Surface No. | Surface type | Radius of curvature | Thickness/ distance | Material Refractive index | Dispersion coefficient | Focal length | Conic coefficient |
|---|---|---|---|---|---|---|---|
| S2 | Aspherical | 9.7686 | 0.0500 | | | | −15.6486 |
| S3 | Aspherical | 7.1780 | 0.2000 | 1.679 | 19.24 | −10.05 | −12.8992 |
| S4 | Aspherical | 3.4591 | 0.3008 | | | | 1.4820 |
| S5 | Aspherical | 6.8178 | 0.2818 | 1.679 | 19.24 | 37.28 | 11.5925 |
| S6 | Aspherical | 9.1754 | 0.4165 | | | | −34.3273 |
| S7 | Aspherical | −36.4526 | 0.4106 | 1.546 | 56.14 | 34.14 | 92.6232 |
| S8 | Aspherical | −12.3885 | 0.6604 | | | | 45.1921 |
| S9 | Aspherical | 5.1776 | 0.3925 | 1.620 | 25.93 | −28.71 | 1.5487 |
| S10 | Aspherical | 3.8948 | 0.4923 | | | | −1.5052 |
| S11 | Aspherical | 4.0826 | 0.6085 | 1.546 | 56.14 | 6.66 | −0.6007 |
| S12 | Aspherical | −31.5446 | 1.1023 | | | | 69.1363 |
| S13 | Aspherical | −3.8053 | 0.4000 | 1.537 | 55.71 | −4.74 | −0.8749 |
| S14 | Aspherical | 7.9644 | 0.3049 | | | | 1.9488 |
| S15 | Spherical | Infinity | 0.1100 | 1.519 | 64.17 | | |
| S16 | Spherical | Infinity | 0.5514 | | | | |
| S17 | Spherical | Infinity | | | | | |

In Embodiment 1, an overall effective focal length f of the camera lens has a value of 6.07 mm, an on-axis distance TTL from the object side surface S1 of the first lens E1 to the imaging plane S17 has a value of 7.10 mm, a half ImgH of a diagonal length of an effective pixel region on the imaging plane S17 has a value of 6.30 mm, and the maximum field of view FOV has a value of 89.3°.

In Embodiment 1, both the object side surface and image side surface of any one of the first lens E1 to the sevenh lens E7 are aspherical, and the surface shape x of each aspherical lens can be defined by using but not limited to the following aspherical formula:

$$x = \frac{ch^2}{1 + \sqrt{1 - (k+1)c^2h^2}} + \sum A_i h^i \qquad (1)$$

where x is a distance vector height from a vertex of the aspherical surface when the aspherical surface is at a height of h along the optical axis direction; c is paraxial curvature of the aspherical surface, c=1/R (that is, the paraxial curvature c is the reciprocal of the radius of curvature R in Table 1 above); k is a conic coefficient; and Ai is a correction coefficient of an i-th order of the aspherical surface. Higher-order coefficients $A_4, A_6, A_8, A_{10}, A_{12}, A_{14}, A_{16}, A_{18}, A_{20}, A_{22}, A_{24}$ and $A_{26}$ of each aspherical lens surface of S1 to S14 that are applicable in Embodiment 1 are given in Table 2 below.

TABLE 2

| Surface No. | A4 | A6 | A8 | A10 | A12 | A14 | A16 |
|---|---|---|---|---|---|---|---|
| S1 | 6.0035E−04 | −2.6216E−03 | −1.2591E−03 | −4.0010E−04 | −2.2737E−04 | −9.0755E−05 | −4.9239E−05 |
| S2 | −1.0185E−02 | 1.1258E−03 | −3.8504E−04 | −4.2145E−06 | −1.3051E−04 | 2.0484E−05 | 4.2754E−06 |
| S3 | 2.8138E−02 | 2.2966E−03 | −1.7191E−03 | 2.0148E−04 | 7.7110E−05 | 3.1025E−04 | 6.4888E−05 |
| S4 | 3.0082E−02 | 7.5017E−03 | −1.0095E−04 | −1.7924E−04 | −2.4639E−04 | 8.7761E−06 | 4.3693E−05 |
| S5 | −5.4967E−02 | 1.6603E−02 | 4.1509E−03 | 6.5773E−04 | −1.5682E−04 | −9.9840E−05 | −4.1914E−05 |
| S6 | −2.3330E−02 | 1.9746E−02 | 6.4766E−03 | 1.4939E−03 | 1.6720E−04 | −4.4167E−05 | −3.3152E−05 |
| S7 | −2.1893E−01 | −1.9194E−02 | −1.4479E−03 | 7.1643E−04 | 2.0584E−04 | 2.0685E−04 | 3.5592E−05 |
| S8 | −2.9526E−01 | −2.4941E−02 | −3.4388E−03 | 1.9311E−05 | −1.5391E−04 | 1.1020E−04 | 8.2234E−05 |
| S9 | −8.5143E−01 | −1.6087E−02 | −2.1211E−02 | 8.2330E−03 | 1.1552E−05 | 1.8504E−03 | 8.8955E−04 |
| S10 | −1.3170E+00 | 1.6255E−01 | −3.6613E−02 | 1.9641E−02 | −4.9181E−03 | 4.0058E−03 | −2.9207E−05 |
| S11 | −2.4200E+00 | 1.7801E−01 | 7.9940E−02 | 9.6790E−03 | −1.9224E−03 | −9.9498E−03 | −7.6738E−03 |
| S12 | −6.1474E−01 | 2.7137E−03 | 1.7550E−01 | −4.9195E−02 | 1.0819E−02 | −1.2717E−02 | −2.5518E−03 |
| S13 | 8.1541E−01 | 4.5267E−01 | −2.6230E−01 | 6.3949E−02 | −3.8125E−03 | −1.1748E−02 | 3.5568E−03 |
| S14 | −4.0469E+00 | 3.7680E−01 | −1.0551E−01 | 3.4568E−02 | −2.4173E−02 | −1.5517E−02 | −1.9688E−03 |

| Surface No. | A18 | A20 | A22 | A24 | A26 |
|---|---|---|---|---|---|
| S1 | −3.8163E−06 | −6.4560E−06 | 0.0000E+00 | 0.0000E+00 | 0.0000E+00 |
| S2 | −7.5554E−06 | 6.8065E−06 | 0.0000E+00 | 0.0000E+00 | 0.0000E+00 |
| S3 | 2.6579E−05 | 1.3105E−05 | 0.0000E+00 | 0.0000E+00 | 0.0000E+00 |
| S4 | 2.4765E−05 | 2.2188E−05 | 0.0000E+00 | 0.0000E+00 | 0.0000E+00 |
| S5 | −2.2912E−06 | 2.8128E−06 | 6.4753E−06 | 2.2911E−06 | −2.2063E−06 |
| S6 | −1.6852E−05 | −3.6115E−06 | −6.1486E−06 | −1.3128E−07 | −9.7475E−07 |
| S7 | 3.9898E−05 | −1.7814E−06 | 5.0092E−06 | −8.2887E−06 | 1.1815E−06 |
| S8 | 5.6722E−05 | 4.2761E−05 | 9.2450E−06 | 1.1839E−05 | −3.4268E−06 |
| S9 | 3.4328E−04 | 1.2036E−04 | −3.2847E−05 | −7.0412E−05 | −3.9626E−05 |
| S10 | −2.4372E−04 | −2.7590E−05 | −9.7469E−05 | −9.0168E−06 | 4.9856E−05 |
| S11 | 2.0499E−03 | 4.6598E−03 | −2.3827E−03 | −2.3628E−03 | −1.2993E−04 |
| S12 | 5.3605E−03 | 6.7020E−04 | −7.2958E−03 | −5.4155E−04 | 1.9196E−03 |

TABLE 2-continued

| | | | | | |
|---|---|---|---|---|---|
| S13 | 1.0845E−03 | 1.9453E−03 | −2.3212E−03 | 2.2334E−03 | −1.1487E−03 |
| S14 | −4.7481E−03 | −2.7984E−03 | −4.0001E−03 | 3.0813E−03 | 1.6334E−04 |

Figure 2A:
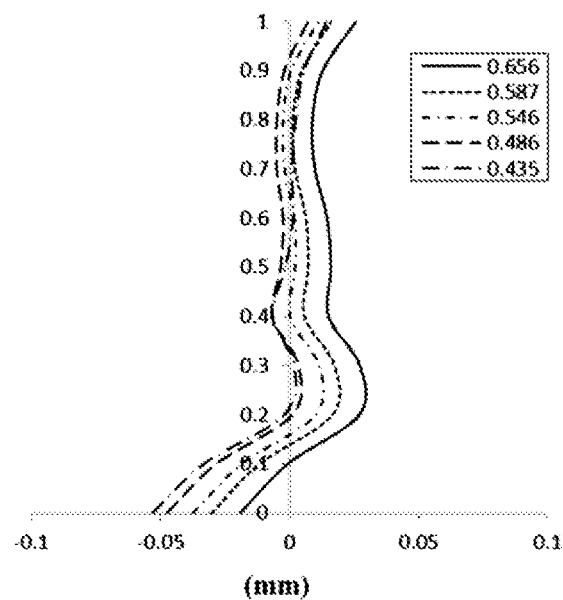
FIGS. 2A to 2D show a longitudinal aberration curve, astigmatism curve, distortion curve and lateral color curve of the camera lens according to Embodiment 1, respectively.
Figure 2B:
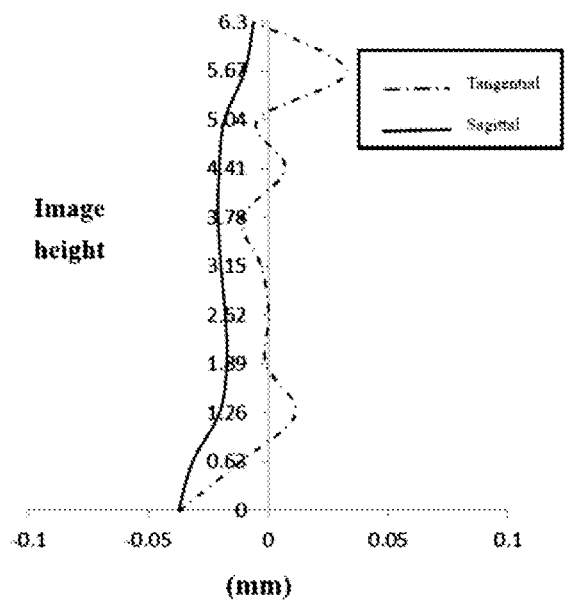
Figure 2C:
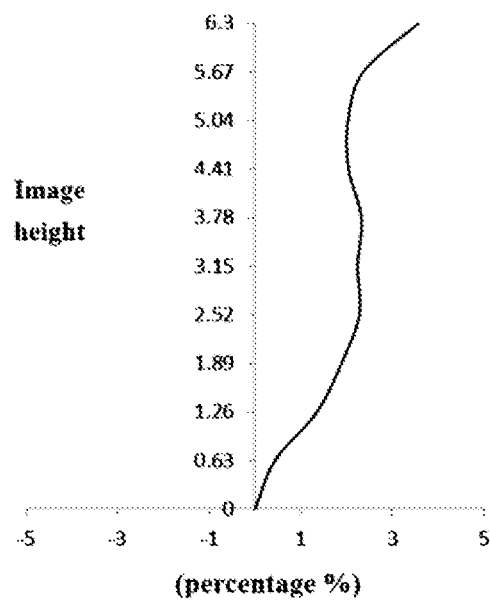
Figure 2D:
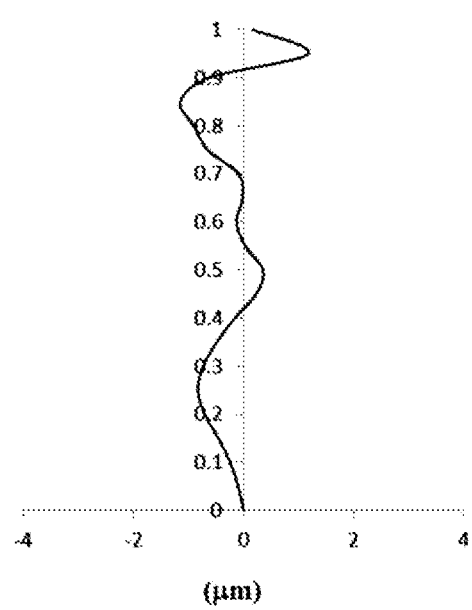

FIG. 2A shows a longitudinal aberration curve of the camera lens according to Embodiment 1, which represents the deviation of the converged focal point after light of different wavelengths passes through the lens assembly. FIG. 2B shows an astigmatism curve of the camera lens according to Embodiment 1, which represents the curvature of the tangential image plane and the curvature of the sagittal image plane. FIG. 2C shows a distortion curve of the camera lens according to Embodiment 1, which represents distortion magnitude values corresponding to different image heights. FIG. 2D shows a lateral color curve of the camera lens according to Embodiment 1, which represents the deviation of different image heights on the imaging plane after light passes through the lens assembly. According to FIGS. 2A to 2D, it can be seen that the camera lens given in Embodiment 1 can achieve good imaging quality.

Embodiment 2

Figure 3:
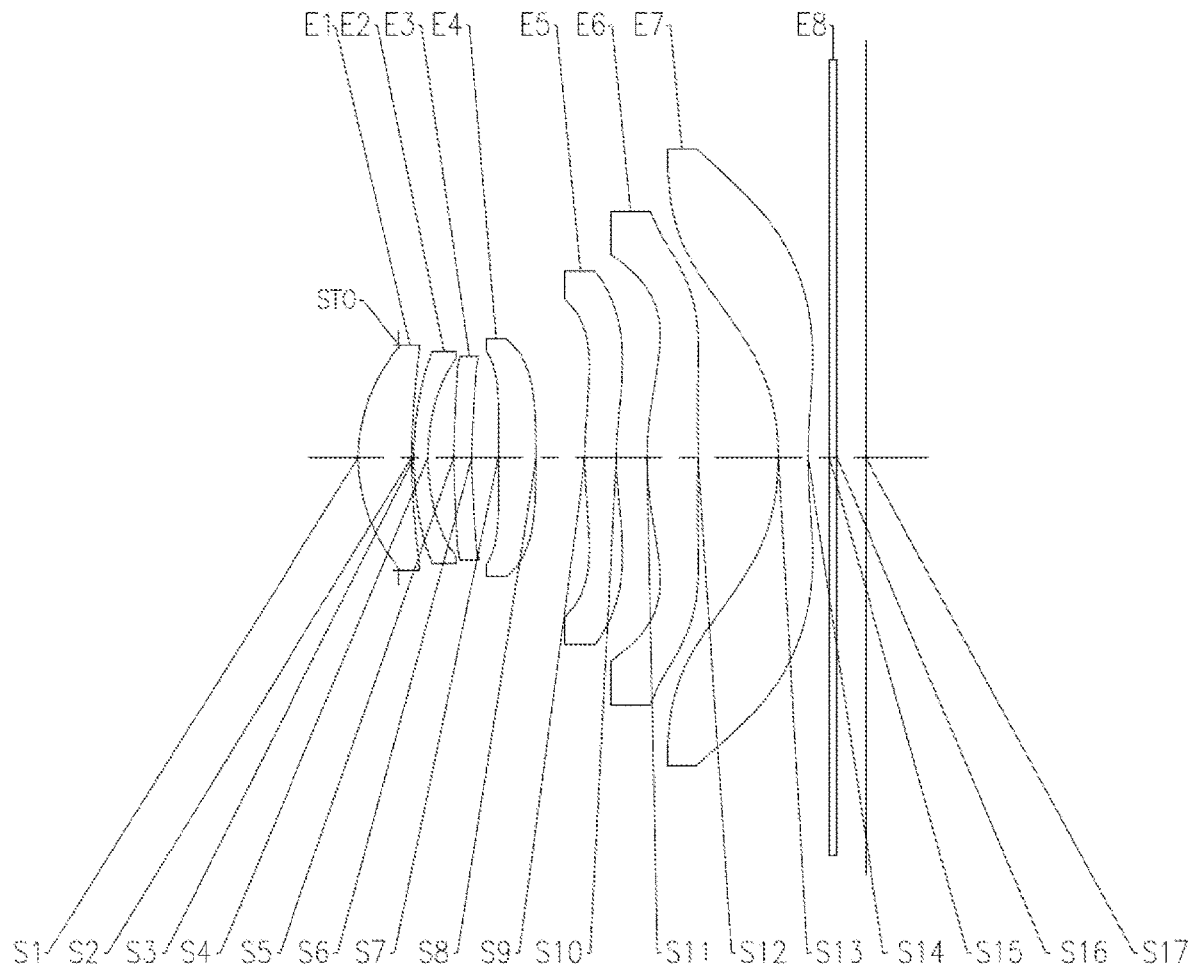
FIG. 3 shows a schematic structural diagram of a camera lens according to Embodiment 2 of the present application.

A camera lens according to Embodiment 2 of the present application will be described below with reference to FIGS. 3 to 4D. In this embodiment and the following embodiments, for the sake of brevity, the description of parts similar to those in Embodiment 1 will be omitted. FIG. 3 shows a schematic structural diagram of the camera lens according to Embodiment 2 of the present application.

As shown in FIG. 3, the camera lens includes a diaphragm STO, a first lens E1, a second lens E2, a third lens E3, a fourth lens E4, a fifth lens E5, a sixth lens E6, a seventh lens E7, and a filter E8 in order from an object side to an image side along an optical axis.

The first lens E1 has a positive refractive power, and has a convex object side surface S1 and a concave image side surface S2. The second lens E2 has a negative refractive power, and has a convex object side surface S3 and a concave image side surface S4. The third lens E3 has a negative refractive power, and has a convex object side surface S5 and a concave image side surface S6. The fourth lens E4 has a positive refractive power, and has a convex object side surface S7 and a convex image side surface S8. The fifth lens E5 has a negative refractive power, and has a convex object side surface S9 and a concave image side surface S10. The sixth lens E6 has a positive refractive power, and has a convex object side surface S11 and a convex image side surface S12. The seventh lens E7 has a negative refractive power, and has a concave object side surface S13 and a concave image side surface S14. The filter E8 has an object side surface S15 and an image side surface S16. The camera lens has an imaging plane S17. Light from an object sequentially passes through the respective surfaces S1 to S16 and finally forms an image on the imaging plane S17.

In Embodiment 2, an overall effective focal length f of the camera lens has a value of 6.07 mm, an on-axis distance TTL from the object side surface S1 of the first lens E1 to the imaging plane S17 has a value of 7.28 mm, a half ImgH of a diagonal length of an effective pixel region on the imaging plane has a value of 6.00 mm, and the maximum field of view FOV has a value of 86.8°.

Table 3 shows a table of basic parameters of the camera lens of Embodiment 2, wherein the units of the radius of curvature, thickness/distance, and focal length are all millimeters (mm). Table 4 shows higher-order coefficients A4 to A30 of each aspherical lens surface that are applicable in Embodiment 2, wherein the surface shape of each aspherical surface can be defined by formula (1) given in Embodiment 1 described above.

TABLE 3

| Surface No. | Surface type | Radius of curvature | Thickness/ distance | Material Refractive index | Material Dispersion coefficient | Focal length | Conic coefficient |
|---|---|---|---|---|---|---|---|
| OBJ | Spherical | Infinity | Infinity | | | | |
| STO | Spherical | Infinity | −0.5800 | | | | |
| S1 | Aspherical | 2.4251 | 0.7704 | 1.546 | 56.14 | 5.69 | 0.0026 |
| S2 | Aspherical | 9.7936 | 0.0300 | | | | 2.1320 |
| S3 | Aspherical | 5.2236 | 0.2000 | 1.679 | 19.24 | −13.25 | 1.3625 |
| S4 | Aspherical | 3.2531 | 0.3685 | | | | 0.1793 |
| S5 | Aspherical | 8.9366 | 0.2599 | 1.679 | 19.24 | −102.31 | −9.1081 |
| S6 | Aspherical | 7.8248 | 0.3788 | | | | −6.8307 |
| S7 | Aspherical | 32.0153 | 0.5413 | 1.546 | 56.14 | 20.76 | −0.0718 |
| S8 | Aspherical | −17.4575 | 0.7045 | | | | 31.1384 |
| S9 | Aspherical | 5.5215 | 0.4514 | 1.620 | 25.93 | −28.52 | 2.3062 |
| S10 | Aspherical | 4.0762 | 0.4407 | | | | 0.0000 |
| S11 | Aspherical | 4.1849 | 0.7267 | 1.546 | 56.14 | 6.82 | 0.0000 |
| S12 | Aspherical | −31.9359 | 1.1525 | | | | 0.0000 |
| S13 | Aspherical | −3.7683 | 0.4249 | 1.537 | 55.71 | −4.72 | −1.0000 |
| S14 | Aspherical | 8.0757 | 0.3049 | | | | 0.0000 |
| S15 | Spherical | Infinity | 0.1100 | 1.519 | 64.17 | | |
| S16 | Spherical | Infinity | 0.4151 | | | | |
| S17 | Spherical | Infinity | | | | | |

TABLE 4

| Surface No. | A4 | A6 | A8 | A10 | A12 | A14 | A16 |
|---|---|---|---|---|---|---|---|
| S1 | −2.0246E−02 | −6.4389E−03 | −1.8669E−03 | −3.9433E−04 | −2.2145E−04 | −9.8449E−05 | −6.3411E−05 |
| S2 | −2.0129E−02 | −5.1425E−04 | 2.3882E−04 | −2.3568E−04 | −5.0632E−05 | −3.1197E−05 | 2.4311E−05 |
| S3 | 2.3787E−02 | 1.3582E−03 | 6.0047E−05 | −5.0908E−04 | −2.1958E−04 | −1.3723E−05 | 4.6707E−05 |
| S4 | 6.0581E−02 | 6.1355E−03 | 1.0635E−03 | −6.6883E−05 | −1.7995E−04 | −5.8625E−05 | 1.4976E−05 |
| S5 | −4.7444E−02 | 1.7557E−02 | 4.1067E−03 | 1.0220E−03 | 1.0521E−06 | −6.9895E−05 | −5.3854E−05 |
| S6 | −5.5002E−02 | 1.8750E−02 | 4.6649E−03 | 1.4643E−03 | 2.5054E−04 | 3.6466E−05 | −2.2513E−05 |
| S7 | −1.9055E−01 | −1.7640E−02 | −9.2345E−04 | 1.5432E−03 | 8.4971E−04 | 5.4663E−04 | 1.9367E−04 |
| S8 | −3.0089E−01 | −3.3323E−02 | −6.5196E−03 | −4.8884E−04 | −2.3524E−04 | 1.2923E−04 | 6.4294E−05 |
| S9 | −8.4445E−01 | −7.5995E−03 | −1.6063E−02 | 1.0012E−02 | −3.8537E−04 | 9.1076E−04 | 7.3406E−05 |
| S10 | −1.4195E+00 | 1.3244E−01 | −4.0028E−02 | 1.5611E−02 | −5.3050E−03 | 2.7758E−03 | 3.1883E−04 |
| S11 | −1.6573E+00 | −5.3763E−02 | 7.5376E−03 | 7.1028E−03 | 1.8379E−03 | 3.7266E−03 | 9.7051E−04 |
| S12 | −4.8746E−01 | −9.5306E−02 | 1.2227E−01 | −2.4260E−02 | 2.9122E−03 | −1.1512E−03 | −3.0838E−03 |
| S13 | 4.0244E−01 | 4.4586E−01 | −1.9777E−01 | 3.4629E−02 | 8.9523E−03 | −6.5470E−03 | 1.8998E−03 |
| S14 | −3.2932E+00 | 3.8095E−01 | −5.9182E−02 | 3.0123E−02 | −5.9797E−04 | −8.7873E−03 | 4.5921E−03 |

| Surface No. | A18 | A20 | A22 | A24 | A26 | A28 | A30 |
|---|---|---|---|---|---|---|---|
| S1 | −1.7901E−05 | −1.5582E−05 | 2.6756E−06 | −3.3341E−06 | −3.7433E−07 | 2.4139E−07 | 1.4280E−06 |
| S2 | −3.5438E−05 | 2.0476E−05 | −7.4753E−06 | 1.6258E−05 | 4.2014E−06 | −1.2733E−06 | −1.7446E−06 |
| S3 | −2.7580E−05 | 1.3712E−05 | −9.4959E−06 | 4.7662E−06 | −1.0805E−06 | 2.9904E−06 | 3.3282E−06 |
| S4 | −7.5219E−05 | 1.3698E−05 | 6.1188E−06 | 5.3689E−06 | −1.5120E−06 | −3.6842E−06 | 1.2114E−06 |
| S5 | −1.3027E−05 | −8.3789E−06 | −1.9170E−06 | 1.6475E−07 | 4.0397E−06 | 2.3667E−06 | 2.4114E−06 |
| S6 | −9.2132E−06 | −6.7433E−06 | 6.5684E−06 | 6.7292E−06 | 4.8194E−06 | 1.5886E−07 | −6.7611E−07 |
| S7 | 9.4681E−05 | 1.5442E−05 | 1.1850E−05 | −5.8580E−06 | −1.4679E−06 | −2.4729E−06 | −1.0239E−06 |
| S8 | 5.4235E−05 | 2.5643E−05 | 1.6274E−05 | 1.1876E−05 | −3.5142E−07 | 5.5045E−07 | −3.8734E−06 |
| S9 | 3.0690E−04 | −5.1218E−05 | −9.2287E−06 | −7.4083E−06 | −2.4703E−06 | 0.0000E+00 | 0.0000E+00 |
| S10 | 5.6023E−04 | −1.9996E−04 | −2.3742E−05 | −1.3926E−04 | 3.1995E−05 | −1.6920E−08 | 0.0000E+00 |
| S11 | −8.1225E−04 | −5.9283E−04 | 2.0127E−04 | 1.1245E−04 | 3.5754E−05 | −1.0866E−09 | 0.0000E+00 |
| S12 | −1.2542E−03 | 1.7607E−03 | 6.6529E−04 | −3.5755E−04 | −8.5556E−05 | −3.4537E−07 | −1.4502E−07 |
| S13 | −1.9642E−03 | 2.0147E−03 | −1.4806E−03 | 5.9867E−04 | −1.1999E−04 | −1.6211E−07 | 9.8339E−09 |
| S14 | 1.2794E−03 | 3.2202E−03 | −3.1402E−03 | −2.7935E−04 | −5.1201E−04 | 1.9281E−06 | 2.1136E−06 |

Figure 4A:
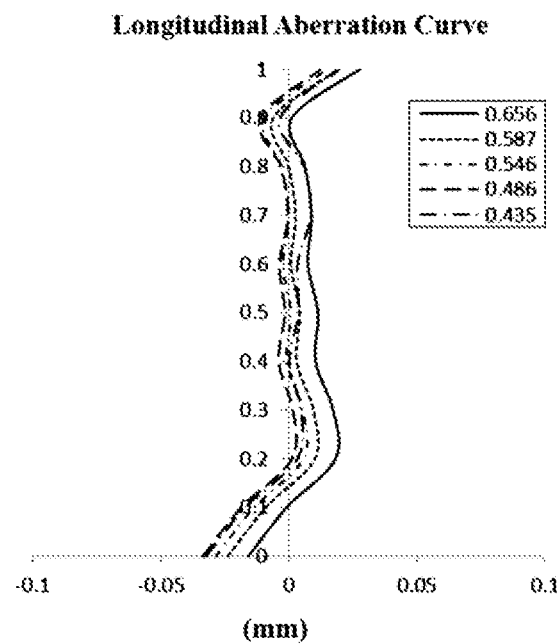
FIGS. 4A to 4D show a longitudinal aberration curve, astigmatism curve, distortion curve and lateral color curve of the camera lens according to Embodiment 2, respectively.
Figure 4B:
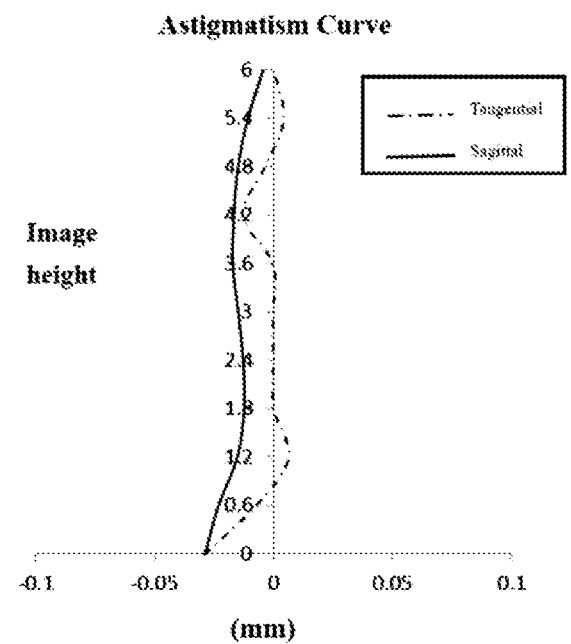
Figure 4C:
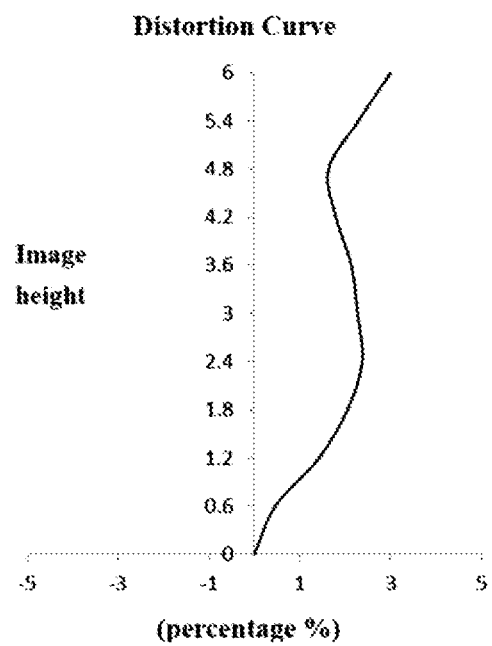
Figure 4D:
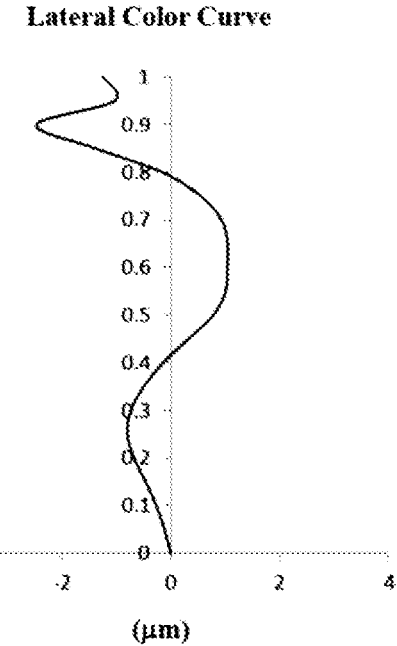

FIG. 4A shows a longitudinal aberration curve of the camera lens according to Embodiment 2, which represents the deviation of the converged focal point after light of different wavelengths passes through the lens assembly. FIG. 4B shows an astigmatism curve of the camera lens according to Embodiment 2, which represents the curvature of the tangential image plane and the curvature of the sagittal image plane. FIG. 4C shows a distortion curve of the camera lens according to Embodiment 2, which represents distortion magnitude values corresponding to different image heights. FIG. 4D shows a lateral color curve of the camera lens according to Embodiment 2, which represents the deviation of different image heights on the imaging plane after light passes through the lens assembly. According to FIGS. 4A to 4D, it can be seen that the camera lens given in Embodiment 2 can achieve good imaging quality.

Embodiment 3

Figure 5:
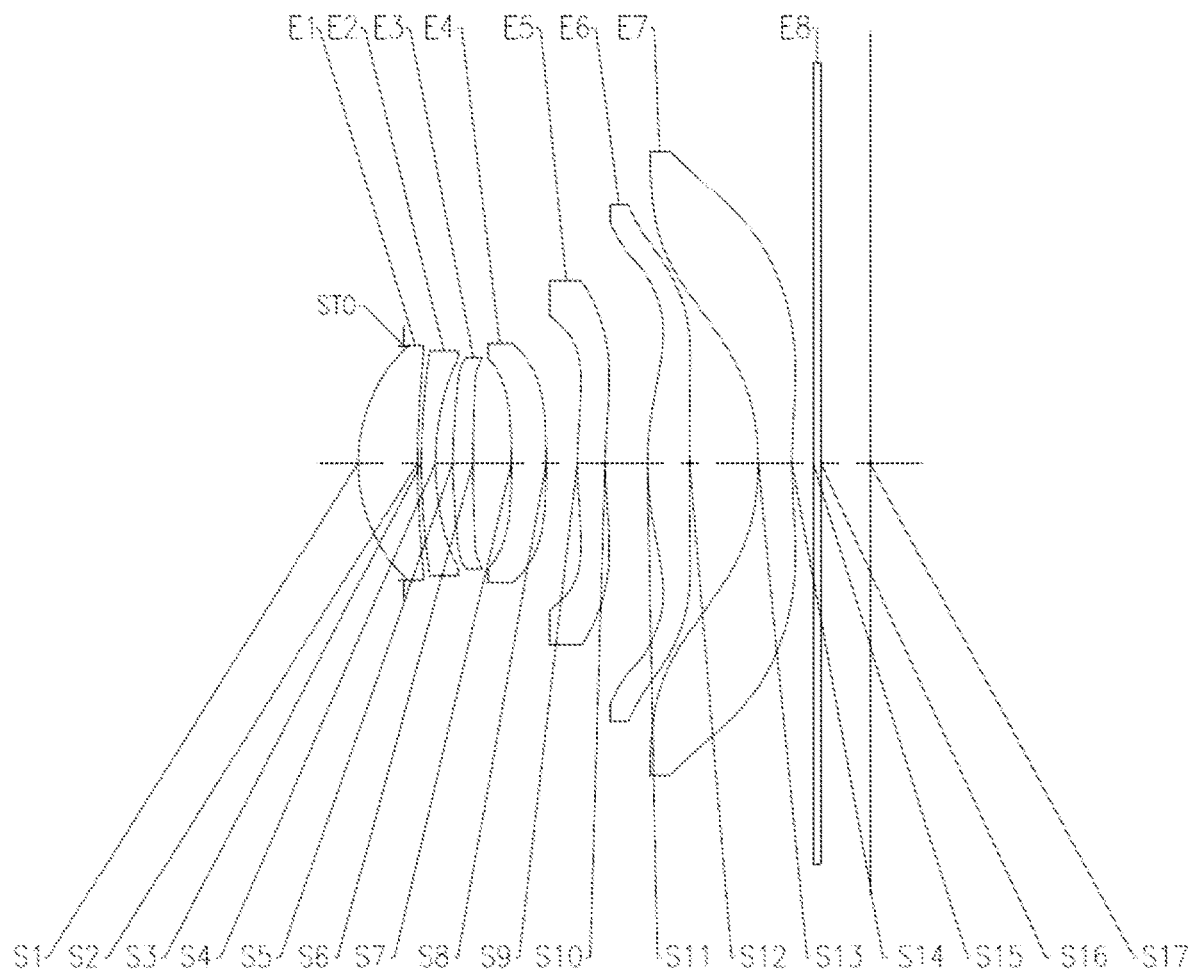
FIG. 5 shows a schematic structural diagram of a camera lens according to Embodiment 3 of the present application.

A camera lens according to Embodiment 3 of the present application will be described below with reference to FIGS. 5 to 6D. FIG. 5 shows a schematic structural diagram of the camera lens according to Embodiment 3 of the present application.

As shown in FIG. 5, the camera lens includes a diaphragm STO, a first lens E1, a second lens E2, a third lens E3, a fourth lens E4, a fifth lens E5, a sixth lens E6, a seventh lens E7, and a filter E8 in order from an object side to an image side along an optical axis.

The first lens E1 has a positive refractive power, and has a convex object side surface S1 and a concave image side surface S2. The second lens E2 has a negative refractive power, and has a convex object side surface S3 and a concave image side surface S4. The third lens E3 has a positive refractive power, and has a convex object side surface S5 and a concave image side surface S6. The fourth lens E4 has a negative refractive power, and has a concave object side surface S7 and a convex image side surface S8. The fifth lens E5 has a negative refractive power, and has a convex object side surface S9 and a concave image side surface S10. The sixth lens E6 has a positive refractive power, and has a convex object side surface S11 and a convex image side surface S12. The seventh lens E7 has a negative refractive power, and has a concave object side surface S13 and a concave image side surface S14. The filter E8 has an object side surface S15 and an image side surface S16. The camera lens has an imaging plane S17. Light from an object sequentially passes through the respective surfaces S1 to S16 and finally forms an image on the imaging plane S17.

In Embodiment 3, an overall effective focal length f of the camera lens has a value of 6.33 mm, an on-axis distance TTL from the object side surface S1 of the first lens E1 to the imaging plane S17 has a value of 7.34 mm, a half ImgH of a diagonal length of an effective pixel region on the imaging plane S17 has a value of 6.20 mm, and the maximum field of view FOV has a value of 86.8°.

Table 5 shows a table of basic parameters of the camera lens of Embodiment 3, wherein the units of the radius of curvature, thickness/distance, and focal length are all millimeters (mm). Table 6 shows higher-order coefficients of each aspherical lens surface that are applicable in Embodiment 3, wherein the surface shape of each aspherical surface can be defined by formula (1) given in Embodiment 1 described above.

TABLE 5

| Surface No. | Surface type | Radius of curvature | Thickness/ distance | Refractive index | Dispersion coefficient | Focal length | Conic coefficient |
|---|---|---|---|---|---|---|---|
| OBJ | Spherical | Infinity | Infinity | | | | |
| STO | Spherical | Infinity | −0.6500 | | | | |
| S1 | Aspherical | 2.3855 | 0.8531 | 1.546 | 56.14 | 5.06 | 0.0089 |
| S2 | Aspherical | 15.1177 | 0.0519 | | | | 12.9498 |
| S3 | Aspherical | 10.2522 | 0.2000 | 1.679 | 19.24 | −8.78 | −43.7376 |
| S4 | Aspherical | 3.7401 | 0.2505 | | | | −0.1659 |
| S5 | Aspherical | 7.5383 | 0.2877 | 1.679 | 19.24 | 24.15 | 13.6115 |
| S6 | Aspherical | 13.7368 | 0.5539 | | | | −0.5997 |
| S7 | Aspherical | −12.5014 | 0.4965 | 1.546 | 56.14 | −109.18 | −0.0727 |
| S8 | Aspherical | −16.0375 | 0.4441 | | | | 2.9091 |
| S9 | Aspherical | 5.0953 | 0.4059 | 1.620 | 25.93 | −67.38 | 0.9040 |
| S10 | Aspherical | 4.4031 | 0.6054 | | | | −1.3106 |
| S11 | Aspherical | 3.9775 | 0.6053 | 1.546 | 56.14 | 6.51 | −0.6317 |
| S12 | Aspherical | −31.9451 | 0.9830 | | | | 68.0258 |
| S13 | Aspherical | −3.8046 | 0.4810 | 1.537 | 55.71 | −4.72 | −0.8985 |
| S14 | Aspherical | 7.9460 | 0.3049 | | | | 1.9432 |
| S15 | Spherical | Infinity | 0.1100 | 1.519 | 64.17 | | |
| S16 | Spherical | Infinity | 0.7095 | | | | |
| S17 | Spherical | Infinity | | | | | |

TABLE 6

| Surface No. | A4 | A6 | A8 | A10 | A12 | A14 | A16 |
|---|---|---|---|---|---|---|---|
| S1 | 6.3856E−03 | −8.4238E−04 | −1.1910E−03 | −3.4558E−04 | −2.4624E−04 | −6.6058E−05 | −7.5241E−05 |
| S2 | −2.7471E−04 | −2.1044E−03 | 7.3787E−04 | −5.1995E−04 | 1.2002E−04 | −1.1026E−04 | 3.8259E−05 |
| S3 | 1.6553E−02 | 8.3065E−03 | −2.9179E−06 | −1.2210E−05 | 1.1950E−03 | 6.4020E−04 | 5.3002E−04 |
| S4 | 6.4582E−03 | 6.1550E−03 | −6.4340E−04 | −1.5796E−03 | −7.8151E−04 | −1.8275E−04 | 2.1950E−04 |
| S5 | −4.9404E−02 | 1.5398E−02 | 5.7258E−03 | 8.7348E−04 | −2.4256E−04 | −1.8433E−04 | −6.6639E−05 |
| S6 | −1.7460E−02 | 1.9160E−02 | 6.9709E−03 | 1.5210E−03 | 1.9185E−04 | −4.6196E−05 | −2.2839E−05 |
| S7 | −2.1652E−01 | −1.5790E−02 | 2.5392E−04 | 8.2454E−04 | 2.0771E−04 | 1.5886E−04 | 2.7536E−05 |
| S8 | −3.2956E−02 | −1.5103E−02 | −9.1750E−03 | 1.2162E−03 | −2.0219E−04 | 1.8038E−04 | 1.4024E−05 |
| S9 | −8.7026E−01 | −2.2140E−02 | −2.6700E−02 | 5.6307E−03 | −1.7293E−03 | 2.6139E−03 | 1.6719E−03 |
| S10 | −1.3006E+00 | 1.7568E−01 | −3.7915E−02 | 1.9329E−02 | −4.7400E−03 | 5.5639E−03 | −7.3983E−04 |
| S11 | −2.4325E+00 | 1.7249E−01 | 8.0293E−02 | 1.4052E−02 | 3.8809E−03 | −7.1780E−03 | −7.0125E−03 |
| S12 | −6.6087E−01 | 8.7949E−02 | 1.7917E−01 | −4.3264E−02 | 1.3195E−02 | −1.3008E−02 | −1.4287E−03 |
| S13 | 8.3877E−01 | 4.4744E−01 | −2.6311E−01 | 6.3514E−02 | 7.2863E−04 | −1.0724E−02 | 2.9515E−03 |
| S14 | −4.0871E+00 | 3.3990E−01 | −1.1811E−01 | 4.5508E−02 | −2.5519E−02 | −1.3638E−02 | −1.3788E−05 |

| Surface No. | A18 | A20 | A22 | A24 | A26 |
|---|---|---|---|---|---|
| S1 | −2.1708E−05 | −2.0797E−05 | 0.0000E+00 | 0.0000E+00 | 0.0000E+00 |
| S2 | −2.8582E−05 | 1.1917E−05 | 0.0000E+00 | 0.0000E+00 | 0.0000E+00 |
| S3 | 1.6897E−04 | 1.0795E−04 | 0.0000E+00 | 0.0000E+00 | 0.0000E+00 |
| S4 | 1.4961E−04 | 8.3989E−05 | 0.0000E+00 | 0.0000E+00 | 0.0000E+00 |
| S5 | −3.2060E−06 | −7.2463E−06 | 4.5150E−06 | 2.5722E−06 | −4.0750E−07 |
| S6 | −1.4808E−05 | −2.7599E−06 | −8.8343E−06 | −2.2620E−07 | 1.9654E−06 |
| S7 | 2.2592E−05 | −3.8778E−06 | 1.6863E−06 | −1.1416E−06 | −2.4255E−06 |
| S8 | 2.9517E−05 | 8.5885E−06 | −2.8614E−06 | 1.1236E−06 | 3.0333E−06 |
| S9 | 8.7422E−04 | 3.6258E−04 | 6.0631E−05 | −5.8093E−06 | −3.3457E−06 |
| S10 | −3.7167E−04 | 2.2736E−04 | 1.2898E−04 | 1.2497E−04 | 2.1159E−05 |
| S11 | −1.1801E−04 | 3.8769E−03 | −3.9978E−03 | −8.0253E−04 | 1.2007E−04 |
| S12 | 1.8615E−03 | 1.1387E−04 | −4.9823E−03 | 1.6798E−04 | 1.7064E−03 |
| S13 | −1.5801E−03 | 3.0955E−03 | −2.6823E−03 | 1.2429E−03 | −3.7505E−04 |
| S14 | −5.4743E−03 | −2.1466E−03 | −1.5816E−03 | 2.3647E−03 | −1.0642E−04 |

Figure 6A:
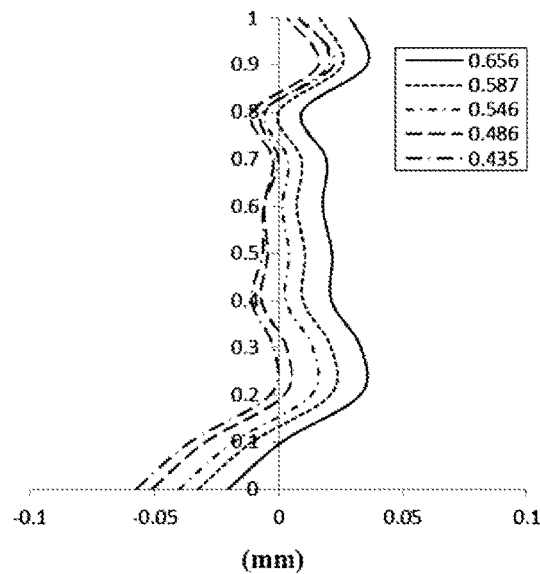
FIGS. 6A to 6D show a longitudinal aberration curve, astigmatism curve, distortion curve and lateral color curve of the camera lens according to Embodiment 3, respectively.
Figure 6B:
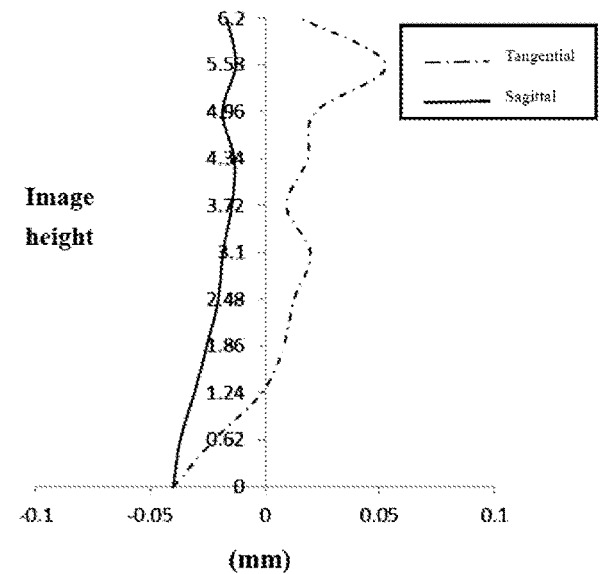
Figure 6C:
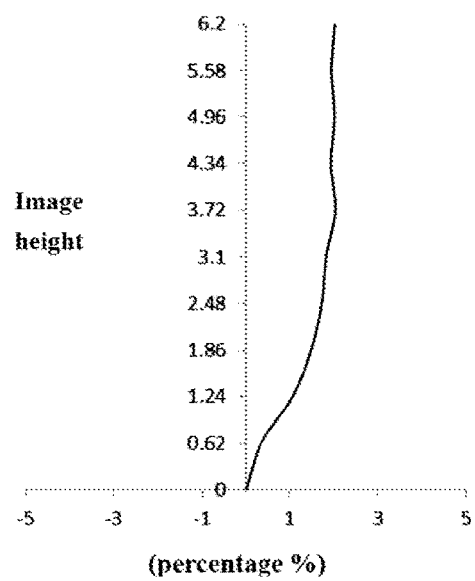
Figure 6D:
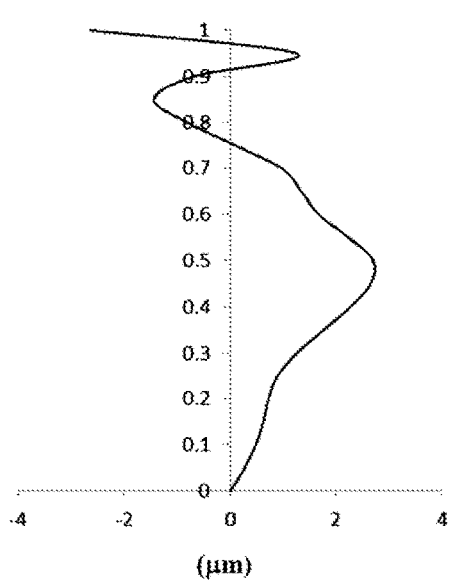

FIG. 6A shows a longitudinal aberration curve of the camera lens according to Embodiment 3, which represents the deviation of the converged focal point after light of different wavelengths passes through the lens assembly. FIG. 6B shows an astigmatism curve of the camera lens according to Embodiment 3, which represents the curvature of the tangential image plane and the curvature of the sagittal image plane. FIG. 6C shows a distortion curve of the camera lens according to Embodiment 3, which represents distortion magnitude values corresponding to different image heights. FIG. 6D shows a lateral color curve of the camera lens according to Embodiment 3, which represents the deviation of different image heights on the imaging plane after light passes through the lens assembly. According to FIGS. 6A to 6D, it can be seen that the camera lens given in Embodiment 3 can achieve good imaging quality.

Embodiment 4

Figure 7:
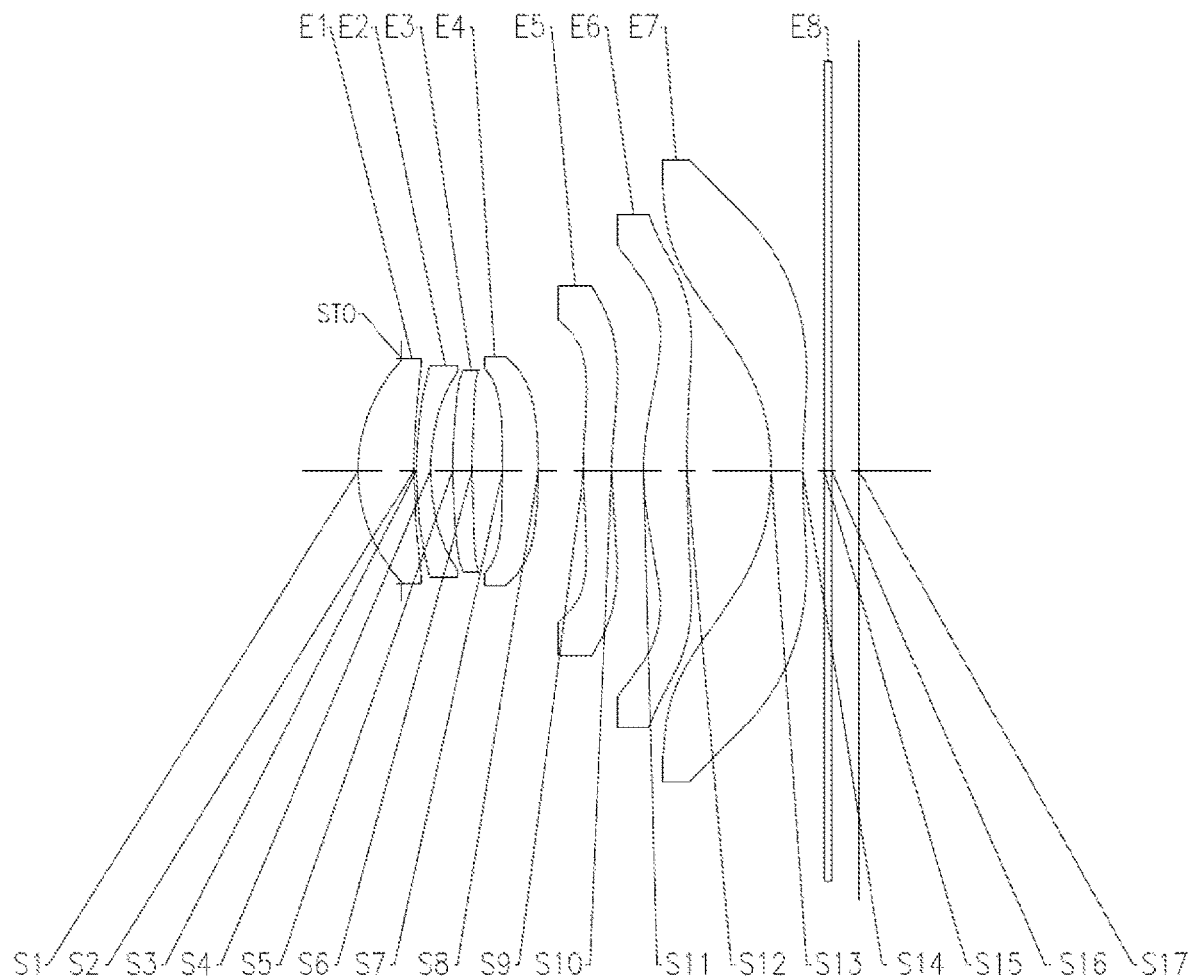
FIG. 7 shows a schematic structural diagram of a camera lens according to Embodiment 4 of the present application.

A camera lens according to Embodiment 4 of the present application will be described below with reference to FIGS. 7 to 8D. FIG. 7 shows a schematic structural diagram of the camera lens according to Embodiment 4 of the present application.

As shown in FIG. 7, the camera lens includes a diaphragm STO, a first lens E1, a second lens E2, a third lens E3, a fourth lens E4, a fifth lens E5, a sixth lens E6, a seventh lens E7, and a filter E8 in order from an object side to an image side along an optical axis.

The first lens E1 has a positive refractive power, and has a convex object side surface S1 and a concave image side surface S2. The second lens E2 has a negative refractive power, and has a convex object side surface S3 and a concave image side surface S4. The third lens E3 has a positive refractive power, and has a convex object side surface S5 and a concave image side surface S6. The fourth lens E4 has a positive refractive power, and has a concave object side surface S7 and a convex image side surface S8. The fifth lens E5 has a negative refractive power, and has a convex object side surface S9 and a concave image side surface S10. The sixth lens E6 has a positive refractive power, and has a convex object side surface S11 and a concave image side surface S12. The seventh lens E7 has a negative refractive power, and has a concave object side surface S13 and a concave image side surface S14. The filter E8 has an object side surface S15 and an image side surface S16. The camera lens has an imaging plane S17. Light from an object sequentially passes through the respective surfaces S1 to S16 and finally forms an image on the imaging plane S17.

In Embodiment 4, an overall effective focal length f of the camera lens has a value of 6.14 mm, an on-axis distance TTL from the object side surface S1 of the first lens E1 to the imaging plane S17 has a value of 7.19 mm, a half ImgH of a diagonal length of an effective pixel region on the imaging plane S17 has a value of 6.20 mm, and the maximum field of view FOV has a value of 88.7°.

Table 7 shows a table of basic parameters of the camera lens of Embodiment 4, wherein the units of the radius of curvature, thickness/distance, and focal length are all millimeters (mm). Table 8 shows higher-order coefficients of each aspherical lens surface that are applicable in Embodiment 4, wherein the surface shape of each aspherical surface can be defined by formula (1) given in Embodiment 1 described above.

TABLE 7

| Surface No. | Surface type | Radius of curvature | Thickness/ distance | Material Refractive index | Material Dispersion coefficient | Focal length | Conic coefficient |
|---|---|---|---|---|---|---|---|
| OBJ | Spherical | Infinity | Infinity | | | | |
| STO | Spherical | Infinity | −0.6200 | | | | |
| S1 | Aspherical | 2.3653 | 0.8019 | 1.546 | 56.14 | 5.47 | −0.0081 |
| S2 | Aspherical | 9.9619 | 0.0377 | | | | −0.8745 |
| S3 | Aspherical | 6.8234 | 0.2000 | 1.679 | 19.24 | −9.92 | 1.6708 |
| S4 | Aspherical | 3.3494 | 0.3129 | | | | 0.0902 |
| S5 | Aspherical | 7.2931 | 0.2803 | 1.679 | 19.24 | 36.46 | −0.2461 |
| S6 | Aspherical | 10.1788 | 0.4374 | | | | 1.2186 |
| S7 | Aspherical | −32.4950 | 0.5118 | 1.546 | 56.14 | 26.97 | −94.3656 |
| S8 | Aspherical | −10.1942 | 0.6504 | | | | −5.1008 |
| S9 | Aspherical | 5.5624 | 0.4071 | 1.620 | 25.93 | −24.79 | −0.0416 |
| S10 | Aspherical | 3.9704 | 0.4589 | | | | 0.0028 |
| S11 | Aspherical | 3.8685 | 0.6214 | 1.546 | 56.14 | 7.43 | 0.0009 |
| S12 | Aspherical | 77.1959 | 1.2077 | | | | −99.0000 |
| S13 | Aspherical | −3.8413 | 0.4522 | 1.537 | 55.71 | −4.78 | −1.0052 |
| S14 | Aspherical | 8.0419 | 0.3049 | | | | −0.0413 |
| S15 | Spherical | Infinity | 0.1100 | 1.519 | 64.17 | | |
| S16 | Spherical | Infinity | 0.3948 | | | | |
| S17 | Spherical | Infinity | | | | | |

TABLE 8

| Surface No. | A4 | A6 | A8 | A10 | A12 | A14 | A16 |
|---|---|---|---|---|---|---|---|
| S1 | −7.5174E−03 | −3.2356E−03 | −1.3190E−03 | −2.0019E−04 | −1.3934E−04 | −1.1992E−05 | −4.9181E−05 |
| S2 | −1.4524E−02 | −1.6819E−04 | −3.1142E−04 | 4.5723E−05 | −1.8286E−04 | 4.3802E−05 | −2.6645E−05 |
| S3 | 7.0796E−03 | 4.0120E−04 | −9.5573E−04 | 1.8995E−05 | −1.8209E−04 | 7.5821E−05 | −8.4082E−06 |
| S4 | 5.5238E−02 | 6.9228E−03 | −1.6056E−04 | −1.9571E−04 | −2.7191E−04 | −1.6563E−05 | 1.3735E−05 |
| S5 | −1.7600E−02 | 2.2743E−02 | 5.6046E−03 | 6.3859E−04 | −2.6296E−04 | −1.6209E−04 | −2.0966E−05 |
| S6 | −3.9838E−02 | 2.0898E−02 | 7.0817E−03 | 1.8669E−03 | 3.6266E−04 | 4.8893E−05 | 7.7743E−06 |
| S7 | −2.0547E−01 | −2.1787E−02 | −2.3842E−03 | 3.9831E−04 | 2.8451E−04 | 2.9037E−04 | 1.4512E−04 |
| S8 | −3.1135E−01 | −3.0285E−02 | −6.0982E−03 | −8.3601E−04 | −6.2822E−04 | −6.7137E−05 | −7.2072E−05 |
| S9 | −8.0652E−01 | −1.3610E−02 | −1.9759E−02 | 8.0517E−03 | −6.2171E−04 | 1.3683E−03 | 5.0898E−04 |
| S10 | −1.4381E+00 | 1.4705E−01 | −3.8330E−02 | 1.8152E−02 | −5.7369E−03 | 3.2096E−03 | −6.5331E−05 |
| S11 | −2.2180E+00 | 2.5544E−02 | 3.1946E−02 | 1.5648E−02 | 7.0507E−03 | 1.7304E−04 | −3.3303E−03 |
| S12 | −6.4862E−01 | −8.6163E−02 | 1.3085E−01 | −3.1750E−02 | 1.0652E−02 | −5.7387E−03 | −2.4669E−03 |
| S13 | 4.0352E−01 | 4.4937E−01 | −1.9772E−01 | 3.3118E−02 | 6.2299E−03 | −5.6668E−03 | 9.5115E−04 |
| S14 | −3.4080E+00 | 4.5450E−01 | −5.7628E−02 | 4.5162E−02 | −5.0025E−03 | −1.0410E−02 | 1.1313E−03 |

| Surface No. | A18 | A20 | A22 | A24 | A26 | A28 | A30 |
|---|---|---|---|---|---|---|---|
| S1 | −8.5893E−06 | −2.2295E−05 | 4.6452E−06 | −4.6591E−06 | 2.6565E−06 | −4.1428E−06 | 3.4969E−06 |
| S2 | 1.8272E−05 | 1.0021E−05 | 1.8428E−05 | 8.2686E−06 | −6.9432E−07 | −8.8680E−06 | −1.3427E−06 |
| S3 | 8.0480E−06 | −3.6689E−06 | 3.0708E−06 | 8.7246E−06 | 4.3767E−06 | −2.2655E−06 | −1.5600E−06 |
| S4 | 2.7087E−05 | 3.6534E−06 | −2.6512E−06 | −3.2580E−06 | 1.9017E−06 | −7.3838E−07 | 1.6375E−06 |
| S5 | 2.0903E−05 | 2.0919E−05 | 9.3744E−06 | 3.7770E−06 | 1.2021E−06 | −1.5631E−06 | −1.7886E−06 |

TABLE 8-continued

| | | | | | | | |
|---|---|---|---|---|---|---|---|
| S6 | 7.2268E−06 | 4.9033E−06 | 3.4730E−06 | 3.6982E−06 | 1.6648E−06 | 2.5010E−06 | 8.9258E−08 |
| S7 | 1.0736E−04 | 5.2328E−05 | 3.8073E−05 | 1.7679E−05 | 1.2899E−05 | 6.4863E−06 | 2.7341E−06 |
| S8 | 1.3425E−05 | −9.9708E−06 | 7.9167E−06 | −2.0373E−06 | 4.9367E−06 | −2.7251E−06 | 3.2542E−06 |
| S9 | 3.2995E−04 | 1.2103E−04 | 9.0042E−05 | −4.8974E−05 | −2.1124E−05 | −2.9963E−06 | 1.0185E−08 |
| S10 | 4.7323E−05 | −3.8067E−05 | −7.3894E−05 | −2.9419E−05 | 3.6219E−05 | 8.6354E−07 | −2.8684E−06 |
| S11 | −2.5217E−03 | 1.2308E−03 | 5.2560E−04 | −2.1938E−04 | −1.8973E−05 | 1.5942E−05 | −7.7350E−06 |
| S12 | 1.1261E−04 | 3.1221E−03 | −7.3125E−04 | −7.0739E−04 | 2.4180E−04 | −2.8466E−06 | −9.3584E−06 |
| S13 | −1.8969E−03 | 2.5193E−03 | −1.8553E−03 | 7.7171E−04 | −1.4672E−04 | −4.0510E−06 | 5.3607E−06 |
| S14 | −2.3575E−03 | 7.1378E−04 | −3.9667E−03 | 1.0501E−03 | 5.4793E−04 | 2.4728E−04 | −1.9505E−04 |

Figure 8A:
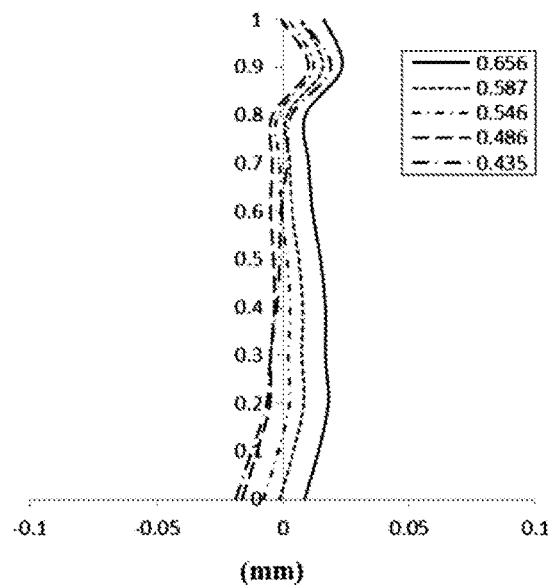
FIGS. 8A to 8D show a longitudinal aberration curve, astigmatism curve, distortion curve and lateral color curve of the camera lens according to Embodiment 4, respectively.
Figure 8B:
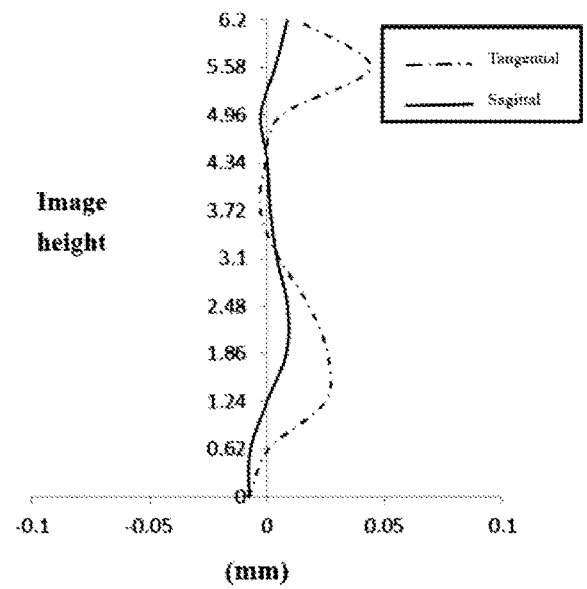
Figure 8C:
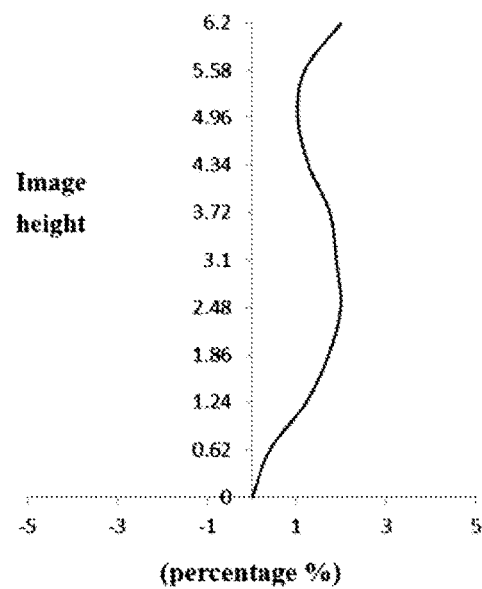
Figure 8D:
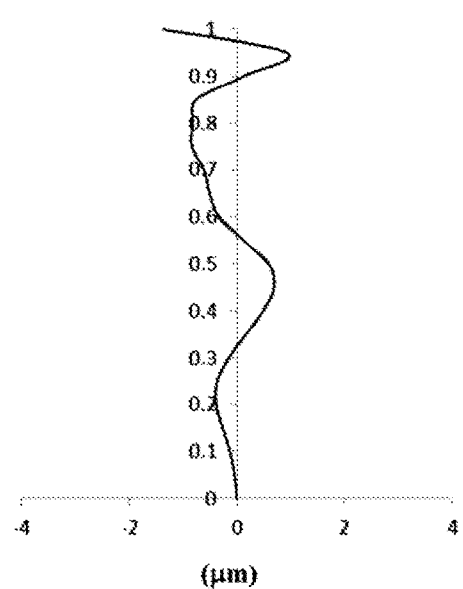

FIG. 8A shows a longitudinal aberration curve of the camera lens according to Embodiment 4, which represents the deviation of the converged focal point after light of different wavelengths passes through the lens assembly. FIG. 8B shows an astigmatism curve of the camera lens according to Embodiment 4, which represents the curvature of the tangential image plane and the curvature of the sagittal image plane. FIG. 8C shows a distortion curve of the camera lens according to Embodiment 4, which represents distortion magnitude values corresponding to different image heights. FIG. 8D shows a lateral color curve of the camera lens according to Embodiment 4, which represents the deviation of different image heights on the imaging plane after light passes through the lens assembly. According to FIGS. 8A to 8D, it can be seen that the camera lens given in Embodiment 4 can achieve good imaging quality.

Embodiment 5

Figure 9:
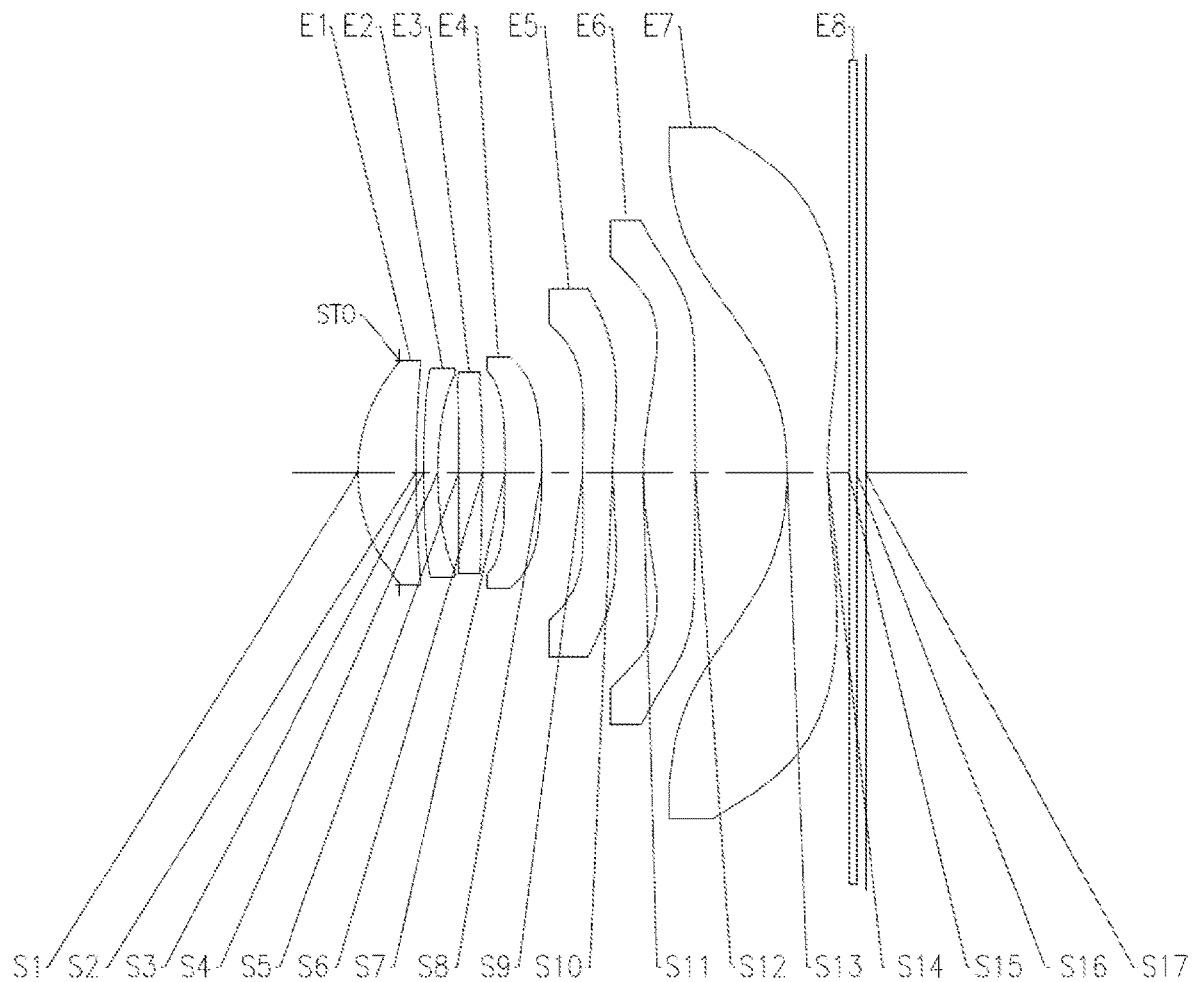
FIG. 9 shows a schematic structural diagram of a camera lens according to Embodiment 5 of the present application.

A camera lens according to Embodiment 5 of the present application will be described below with reference to FIGS. 9 to 10D. FIG. 9 shows a schematic structural diagram of the camera lens according to Embodiment 5 of the present application.

As shown in FIG. 9, the camera lens includes a diaphragm STO, a first lens E1, a second lens E2, a third lens E3, a fourth lens E4, a fifth lens E5, a sixth lens E6, a seventh lens E7, and a filter E8 in order from an object side to an image side along an optical axis.

The first lens E1 has a positive refractive power, and has a convex object side surface S1 and a concave image side surface S2. The second lens E2 has a negative refractive power, and has a convex object side surface S3 and a concave image side surface S4. The third lens E3 has a positive refractive power, and has a convex object side surface S5 and a convex image side surface S6. The fourth lens E4 has a positive refractive power, and has a concave object side surface S7 and a convex image side surface S8. The fifth lens E5 has a negative refractive power, and has a convex object side surface S9 and a concave image side surface S10. The sixth lens E6 has a positive refractive power, and has a convex object side surface S11 and a convex image side surface S12. The seventh lens E7 has a negative refractive power, and has a concave object side surface S13 and a concave image side surface S14. The filter E8 has an object side surface S15 and an image side surface S16. The camera lens has an imaging plane S17. Light from an object sequentially passes through the respective surfaces S1 to S16 and finally forms an image on the imaging plane S17.

In Embodiment 5, an overall effective focal length f of the camera lens has a value of 5.91 mm, an on-axis distance TTL from the object side surface S1 of the first lens E1 to the imaging plane S17 has a value of 7.28 mm, a half ImgH of a diagonal length of an effective pixel region on the imaging plane S17 has a value of 6.00 mm, and the maximum field of view FOV has a value of 86.8°.

Table 9 shows a table of basic parameters of the camera lens of Embodiment 5, wherein the units of the radius of curvature, thickness/distance, and focal length are all millimeters (mm). Table 10 shows higher-order coefficients of each aspherical lens surface that are applicable in Embodiment 5, wherein the surface shape of each aspherical surface can be defined by formula (1) given in Embodiment 1 described above.

TABLE 9

| | | | | Material | | | |
|---|---|---|---|---|---|---|---|
| Surface No. | Surface type | Radius of curvature | Thickness/ distance | Refractive index | Dispersion coefficient | Focal length | Conic coefficient |
| OBJ | Spherical | Infinity | Infinity | | | | |
| STO | Spherical | Infinity | −0.6000 | | | | |
| S1 | Aspherical | 2.4286 | 0.8328 | 1.546 | 56.14 | 5.10 | 0.0045 |
| S2 | Aspherical | 16.6784 | 0.1123 | | | | 7.1635 |
| S3 | Aspherical | 19.7912 | 0.2000 | 1.679 | 19.24 | −10.48 | 90.0515 |
| S4 | Aspherical | 5.2138 | 0.3000 | | | | 1.3120 |
| S5 | Aspherical | 70.0000 | 0.3446 | 1.679 | 19.24 | 39.08 | 99.0000 |
| S6 | Aspherical | −42.6395 | 0.3203 | | | | −0.0001 |
| S7 | Aspherical | −23.8726 | 0.5270 | 1.546 | 56.14 | 34.34 | −99.0000 |
| S8 | Aspherical | −10.5874 | 0.5885 | | | | −12.3591 |
| S9 | Aspherical | 8.8632 | 0.4318 | 1.620 | 25.93 | −14.98 | 6.2452 |
| S10 | Aspherical | 4.4516 | 0.4357 | | | | 1.5036 |
| S11 | Aspherical | 4.0410 | 0.7498 | 1.546 | 56.14 | 6.86 | −0.3392 |
| S12 | Aspherical | −48.0630 | 1.3148 | | | | 0.6030 |
| S13 | Aspherical | −4.2046 | 0.5792 | 1.537 | 55.71 | −4.96 | −1.0375 |

TABLE 9-continued

| Surface No. | Surface type | Radius of curvature | Thickness/ distance | Material Refractive index | Dispersion coefficient | Focal length | Conic coefficient |
|---|---|---|---|---|---|---|---|
| S14 | Aspherical | 7.6395 | 0.3049 | | | | −2.3174 |
| S15 | Spherical | Infinity | 0.1100 | 1.519 | 64.17 | | |
| S16 | Spherical | Infinity | 0.1330 | | | | |
| S17 | Spherical | Infinity | | | | | |

TABLE 10

| Surface No. | A4 | A6 | A8 | A10 | A12 | A14 | A16 |
|---|---|---|---|---|---|---|---|
| S1 | 5.2037E−03 | −4.1465E−03 | −2.9821E−03 | −1.1193E−03 | −4.8785E−04 | −1.4996E−04 | −9.1894E−05 |
| S2 | −4.3005E−03 | −3.7937E−04 | −7.1672E−04 | −4.3206E−05 | −1.6827E−05 | 1.0323E−05 | 5.2097E−06 |
| S3 | 2.7469E−02 | 3.3183E−03 | −6.6157E−04 | −8.1265E−05 | −1.3517E−04 | −3.7926E−05 | −2.1224E−05 |
| S4 | 4.7695E−02 | 6.3669E−03 | 1.6890E−03 | 4.3320E−04 | −1.0309E−04 | −1.5194E−04 | −8.2352E−05 |
| S5 | −3.1931E−02 | 1.5924E−02 | 5.3958E−03 | 9.2620E−04 | −1.1088E−04 | −1.5659E−04 | −8.8540E−05 |
| S6 | −3.0792E−02 | 1.7507E−02 | 5.5454E−03 | 1.0981E−03 | 1.8386E−04 | 1.8494E−05 | 2.8080E−06 |
| S7 | −2.3373E−01 | −2.4166E−02 | −3.9403E−03 | −1.7373E−04 | 2.7656E−04 | 4.7239E−04 | 2.3888E−04 |
| S8 | −3.0295E−01 | −2.7608E−02 | −4.9748E−03 | −8.6583E−04 | −3.2942E−04 | 1.1106E−05 | 2.4842E−05 |
| S9 | −8.3955E−01 | 5.3348E−03 | −1.3062E−02 | 8.3121E−03 | 6.5139E−04 | 1.6546E−03 | 2.9915E−04 |
| S10 | −1.6157E+00 | 1.3673E−01 | −5.3770E−02 | 1.1765E−02 | −6.5149E−03 | 2.3807E−03 | −7.1321E−04 |
| S11 | −2.1135E+00 | 3.7040E−02 | 3.5167E−02 | 3.9109E−02 | −2.0560E−02 | −5.4795E−03 | −4.3274E−03 |
| S12 | −7.5793E−01 | −3.3298E−02 | 1.2603E−01 | −2.5296E−02 | −1.3733E−02 | −1.9491E−03 | 4.2776E−03 |
| S13 | 7.0038E−01 | 4.7075E−01 | −2.7239E−01 | 7.2329E−02 | −1.7223E−03 | −1.0574E−02 | 2.1071E−03 |
| S14 | −3.3351E+00 | 1.3328E−01 | −8.1196E−02 | 3.1741E−02 | 1.4506E−02 | −1.0393E−02 | 1.6138E−03 |

| Surface No. | A18 | A20 | A22 | A24 | A26 | A28 | A30 |
|---|---|---|---|---|---|---|---|
| S1 | −3.6071E−05 | −4.5456E−05 | −2.4843E−05 | −2.1755E−05 | −2.4916E−06 | 2.2808E−06 | 8.7766E−06 |
| S2 | 8.6375E−06 | 6.6830E−06 | 7.5307E−06 | 5.1037E−06 | 1.1529E−06 | −2.5799E−06 | −1.6252E−06 |
| S3 | −7.0767E−06 | −4.2628E−06 | 2.3330E−06 | 2.9716E−06 | 4.7579E−06 | 3.6796E−06 | 2.9334E−06 |
| S4 | −2.5107E−05 | 6.9930E−06 | 1.0495E−05 | 5.8525E−06 | −1.4741E−07 | 2.1609E−07 | −3.2877E−07 |
| S5 | −1.4691E−05 | 9.4957E−06 | 1.8206E−05 | 8.8885E−06 | −1.1150E−06 | −7.1871E−06 | −3.7974E−06 |
| S6 | −5.9013E−06 | −1.0761E−06 | −9.5801E−08 | 3.7515E−06 | 1.2414E−06 | 6.1295E−07 | −1.1565E−06 |
| S7 | 1.5999E−04 | 2.9577E−05 | 1.2172E−05 | −2.2281E−05 | −6.2070E−06 | −9.1803E−06 | 3.9291E−06 |
| S8 | 2.3097E−05 | 1.2625E−05 | 3.0348E−06 | 1.7845E−06 | −1.3648E−06 | 4.5173E−06 | −4.8458E−07 |
| S9 | −1.6729E−04 | −3.5754E−04 | −2.5694E−04 | −1.3461E−04 | −4.4380E−05 | 0.0000E+00 | 0.0000E+00 |
| S10 | 5.2641E−05 | −2.3216E−04 | 5.0272E−05 | −5.2032E−05 | 3.9106E−05 | −8.6301E−06 | 1.3722E−06 |
| S11 | −1.0653E−03 | 9.4296E−04 | 7.7948E−04 | −4.3080E−04 | −1.6320E−04 | 4.8300E−05 | 6.6572E−05 |
| S12 | 1.0629E−03 | 9.5669E−04 | −1.1695E−03 | −9.9174E−04 | 5.8589E−04 | 1.7886E−04 | −1.1805E−04 |
| S13 | −9.7003E−05 | 1.5118E−03 | −3.1855E−03 | 2.8934E−03 | −8.3991E−04 | −2.4907E−05 | 1.6372E−05 |
| S14 | −1.3592E−02 | 7.4484E−04 | −7.6730E−03 | −2.6618E−04 | −9.5428E−04 | −2.6402E−05 | −1.1432E−03 |

Figure 10A:
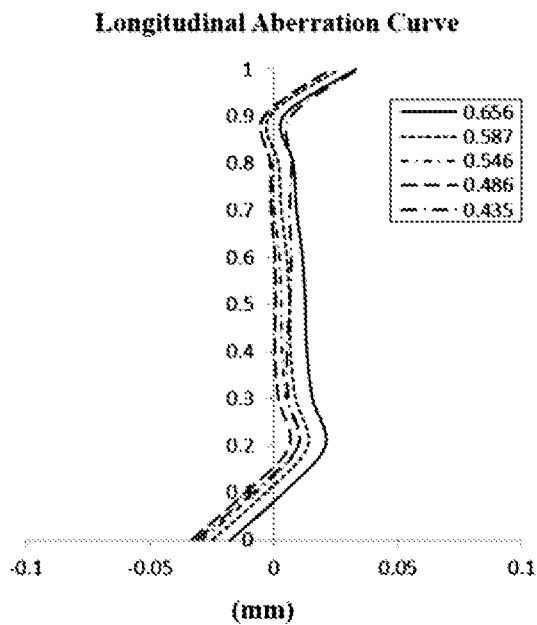
FIGS. 10A to 10D show a longitudinal aberration curve, astigmatism curve, distortion curve and lateral color curve of the camera lens according to Embodiment 5, respectively.
Figure 10B:
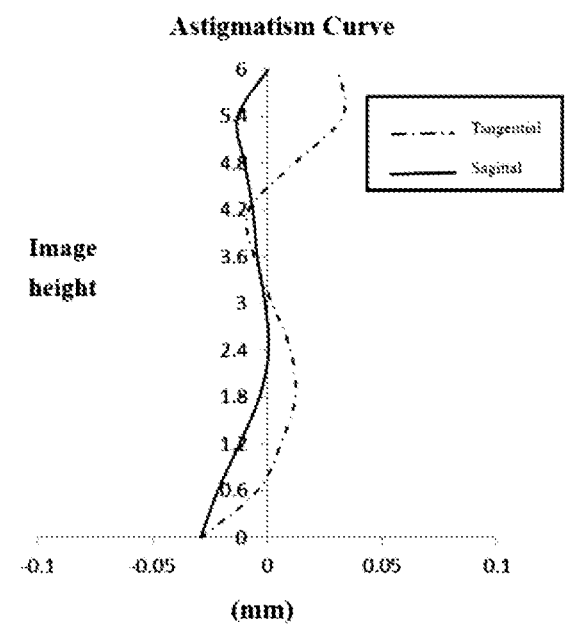
Figure 10C:
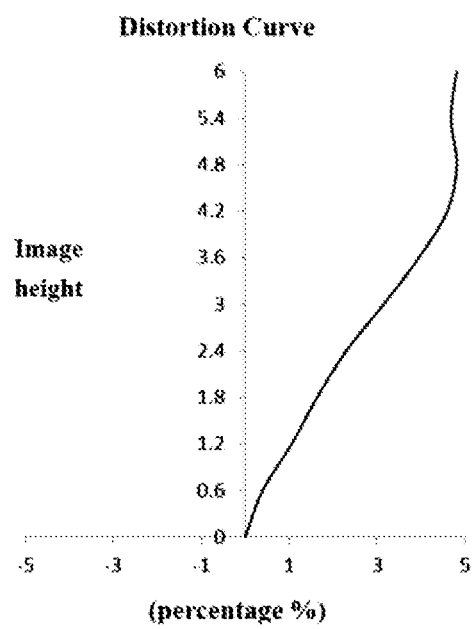
Figure 10D:
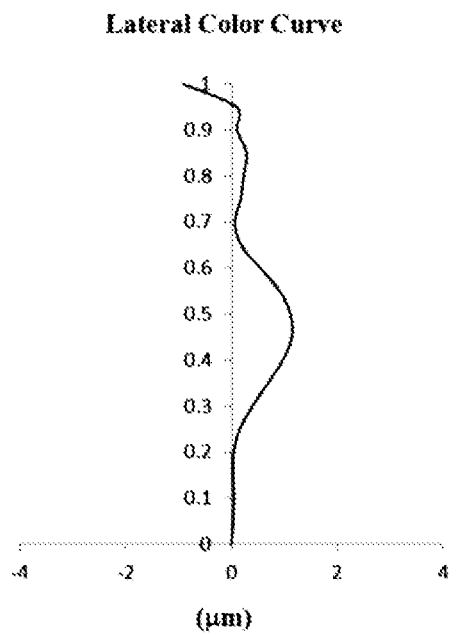

FIG. 10A shows a longitudinal aberration curve of the camera lens according to Embodiment 5, which represents the deviation of the converged focal point after light of different wavelengths passes through the lens assembly. FIG. 10B shows an astigmatism curve of the camera lens according to Embodiment 5, which represents the curvature of the tangential image plane and the curvature of the sagittal image plane. FIG. 10C shows a distortion curve of the camera lens according to Embodiment 5, which represents distortion magnitude values corresponding to different image heights. FIG. 10D shows a lateral color curve of the camera lens according to Embodiment 5, which represents the deviation of different image heights on the imaging plane after light passes through the lens assembly. According to FIGS. 10A to 10D, it can be seen that the camera lens given in Embodiment 5 can achieve good imaging quality.

Embodiment 6

Figure 11:
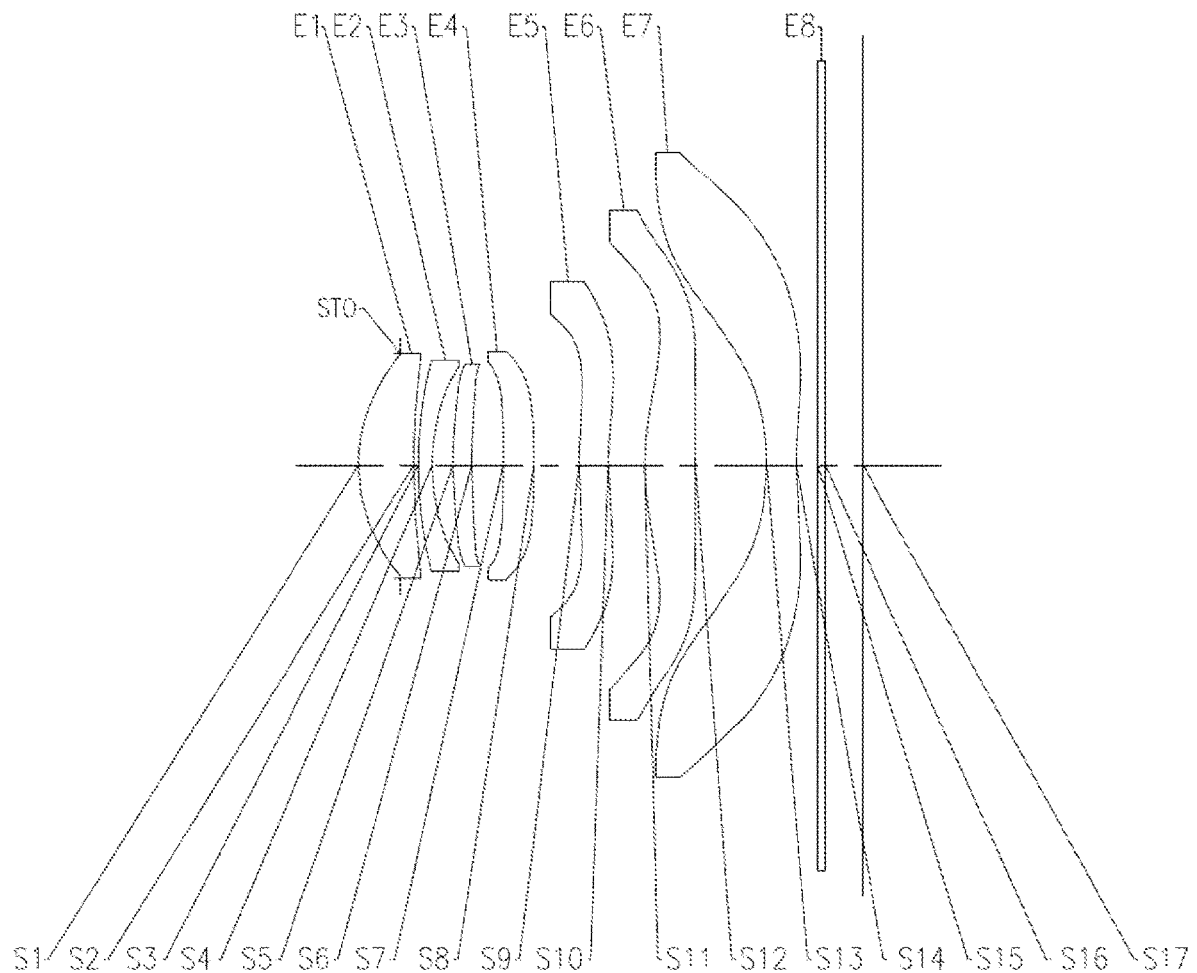
FIG. 11 shows a schematic structural diagram of a camera lens according to Embodiment 6 of the present application.

A camera lens according to Embodiment 6 of the present application will be described below with reference to FIGS. 11 to 12D. FIG. 11 shows a schematic structural diagram of the camera lens according to Embodiment 6 of the present application.

As shown in FIG. 11, the camera lens includes a diaphragm STO, a first lens E1, a second lens E2, a third lens E3, a fourth lens E4, a fifth lens E5, a sixth lens E6, a seventh lens E7, and a filter E8 in order from an object side to an image side along an optical axis.

The first lens E1 has a positive refractive power, and has a convex object side surface S1 and a concave image side surface S2. The second lens E2 has a negative refractive power, and has a convex object side surface S3 and a concave image side surface S4. The third lens E3 has a positive refractive power, and has a convex object side surface S5 and a concave image side surface S6. The fourth lens E4 has a positive refractive power, and has a convex object side surface S7 and a convex image side surface S8. The fifth lens E5 has a negative refractive power, and has a convex object side surface S9 and a concave image side surface S10. The sixth lens E6 has a positive refractive power, and has a convex object side surface S11 and a convex image side surface S12. The seventh lens E7 has a negative refractive power, and has a concave object side surface S13 and a concave image side surface S14. The filter E8 has an object side surface S15 and an image side surface S16. The camera lens has an imaging plane S17. Light from an object sequentially passes through the respective surfaces S1 to S16 and finally forms an image on the imaging plane S17.

In Embodiment 6, an overall effective focal length f of the camera lens has a value of 6.19 mm, an on-axis distance TTL from the object side surface S1 of the first lens E1 to the imaging plane S17 has a value of 7.24 mm, a half ImgH of a diagonal length of an effective pixel region on the imaging plane S17 has a value of 6.20 mm, and the maximum field of view FOV has a value of 88.3°.

Table 11 shows a table of basic parameters of the camera lens of Embodiment 6, wherein the units of the radius of curvature, thickness/distance, and focal length are all millimeters (mm). Table 12 shows higher-order coefficients of each aspherical lens surface that are applicable in Embodiment 6, wherein the surface shape of each aspherical surface can be defined by formula (1) given in Embodiment 1 described above.

TABLE 11

| Surface No. | Surface type | Radius of curvature | Thickness/ distance | Material Refractive index | Dispersion coefficient | Focal length | Conic coefficient |
|---|---|---|---|---|---|---|---|
| OBJ | Spherical | Infinity | Infinity | | | | |
| STO | Spherical | Infinity | −0.6000 | | | | |
| S1 | Aspherical | 2.4006 | 0.7899 | 1.546 | 56.14 | 5.51 | −0.0880 |
| S2 | Aspherical | 10.4357 | 0.0687 | | | | −10.0186 |
| S3 | Aspherical | 6.5506 | 0.2000 | 1.679 | 19.24 | −9.93 | −9.5827 |
| S4 | Aspherical | 3.2806 | 0.2952 | | | | 1.3615 |
| S5 | Aspherical | 6.6692 | 0.2684 | 1.679 | 19.24 | 40.32 | 11.9637 |
| S6 | Aspherical | 8.6742 | 0.4477 | | | | −29.2734 |
| S7 | Aspherical | 100.0000 | 0.4426 | 1.546 | 56.14 | 32.06 | 99.0000 |
| S8 | Aspherical | −21.2034 | 0.6474 | | | | −97.1077 |
| S9 | Aspherical | 5.5980 | 0.4265 | 1.620 | 25.93 | −28.46 | 1.6429 |
| S10 | Aspherical | 4.1261 | 0.5218 | | | | −1.5275 |
| S11 | Aspherical | 4.0108 | 0.7240 | 1.546 | 56.14 | 6.57 | −0.6810 |
| S12 | Aspherical | −32.0147 | 1.0227 | | | | 68.2324 |
| S13 | Aspherical | −3.8009 | 0.4252 | 1.537 | 55.71 | −4.74 | −0.8733 |
| S14 | Aspherical | 7.9860 | 0.3049 | | | | 1.9265 |
| S15 | Spherical | Infinity | 0.1100 | 1.519 | 64.17 | | |
| S16 | Spherical | Infinity | 0.5433 | | | | |
| S17 | Spherical | Infinity | | | | | |

TABLE 12

| Surface No. | A4 | A6 | A8 | A10 | A12 | A14 | A16 |
|---|---|---|---|---|---|---|---|
| S1 | −2.3044E−03 | −3.1053E−03 | −1.0064E−03 | −2.1941E−04 | −9.7631E−05 | −3.3223E−05 | −2.0880E−05 |
| S2 | −8.1201E−03 | −7.3436E−04 | 1.2476E−04 | −2.1324E−04 | −3.3663E−05 | −9.7565E−06 | 1.1860E−06 |
| S3 | 3.1813E−02 | −1.4132E−03 | −7.8241E−04 | −1.9084E−04 | 2.5395E−04 | 2.3768E−04 | 1.0948E−04 |
| S4 | 2.8334E−02 | 3.9332E−03 | −7.3182E−04 | −5.1551E−04 | −6.1947E−05 | 1.3380E−04 | 1.0891E−04 |
| S5 | −5.1698E−02 | 1.5083E−02 | 4.1339E−03 | 7.1912E−04 | −5.9144E−05 | −6.7670E−05 | −1.9706E−05 |
| S6 | −2.1795E−02 | 1.8230E−02 | 6.4033E−03 | 1.8256E−03 | 3.6438E−04 | 7.5190E−05 | −7.2386E−06 |
| S7 | −1.9289E−01 | −1.8768E−02 | −2.3048E−03 | 4.6411E−04 | 1.0453E−04 | 1.8969E−04 | 3.1286E−05 |
| S8 | −2.9770E−01 | −2.6709E−02 | −5.2766E−03 | −1.1670E−04 | −4.1670E−04 | 3.1603E−05 | −4.6024E−05 |
| S9 | −8.5017E−01 | −1.4347E−02 | −1.9642E−02 | 9.5104E−03 | 8.4920E−05 | 1.3340E−03 | 5.2107E−06 |
| S10 | −1.3180E+00 | 1.6690E−01 | −3.6722E−02 | 1.9338E−02 | −5.3788E−03 | 3.3227E−03 | 1.5254E−04 |
| S11 | −2.4474E+00 | 1.4757E−01 | 8.5577E−02 | 2.8684E−02 | −5.2028E−03 | −1.2732E−02 | −6.6081E−03 |
| S12 | −6.2225E−01 | 1.6244E−03 | 1.7264E−01 | −4.2106E−02 | −5.0055E−04 | −9.8426E−03 | −9.1738E−04 |
| S13 | 8.1205E−01 | 4.6081E−01 | −2.6245E−01 | 6.3695E−02 | −3.0919E−03 | −1.0005E−02 | 8.8449E−04 |
| S14 | −4.0297E+00 | 3.2168E−01 | −1.3022E−01 | 3.9155E−02 | −1.3310E−02 | −1.2528E−02 | −7.5829E−04 |

| Surface No. | A18 | A20 | A22 | A24 | A26 |
|---|---|---|---|---|---|
| S1 | −6.4079E−06 | −3.7244E−06 | 0.0000E+00 | 0.0000E+00 | 0.0000E+00 |
| S2 | 2.9811E−06 | 7.4874E−06 | 0.0000E+00 | 0.0000E+00 | 0.0000E+00 |
| S3 | 4.1543E−05 | 1.0500E−05 | 0.0000E+00 | 0.0000E+00 | 0.0000E+00 |
| S4 | 4.0981E−05 | 1.0367E−05 | 0.0000E+00 | 0.0000E+00 | 0.0000E+00 |
| S5 | 8.7926E−07 | 3.2627E−06 | 2.3304E−06 | −3.5444E−09 | −1.6414E−07 |
| S6 | −3.0772E−06 | −8.3748E−06 | 2.7396E−06 | 2.0621E−06 | 2.3196E−06 |
| S7 | 4.6511E−05 | −5.1340E−07 | 1.2714E−05 | −1.8944E−06 | 2.3041E−06 |
| S8 | 2.1475E−05 | −7.2235E−06 | 5.6353E−06 | 9.5673E−07 | 3.6204E−06 |
| S9 | 3.5122E−04 | 1.0130E−04 | 1.5196E−06 | −5.7420E−05 | −2.4340E−05 |
| S10 | 2.9740E−05 | −1.9477E−04 | −4.8283E−05 | −2.2074E−05 | 7.1085E−05 |
| S11 | 2.7268E−03 | 4.6448E−03 | −4.5412E−05 | −1.0240E−03 | 6.2996E−05 |
| S12 | 2.4468E−03 | 3.8708E−04 | −4.9011E−03 | −1.0627E−03 | 1.2183E−03 |
| S13 | −3.1769E−04 | 3.4040E−03 | −3.3476E−03 | 2.1065E−03 | −3.9947E−04 |
| S14 | −7.0321E−03 | −2.7913E−03 | −4.4990E−03 | 2.4751E−03 | 2.9993E−05 |

Figure 12A:
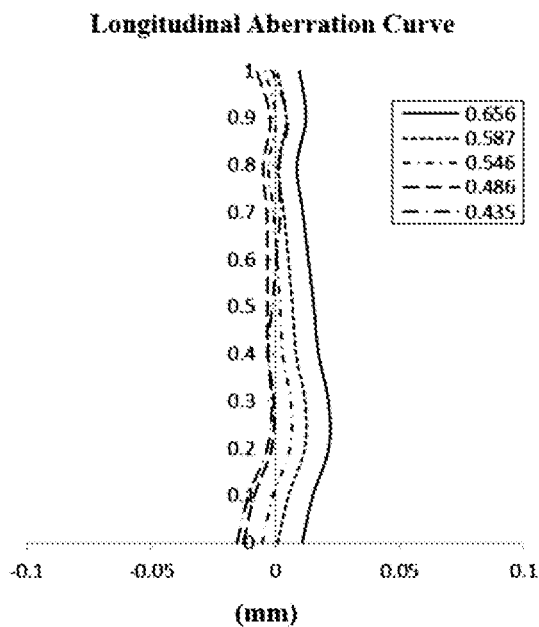
FIGS. 12A to 12D show a longitudinal aberration curve, astigmatism curve, distortion curve and lateral color curve of the camera lens according to Embodiment 6, respectively.
Figure 12B:
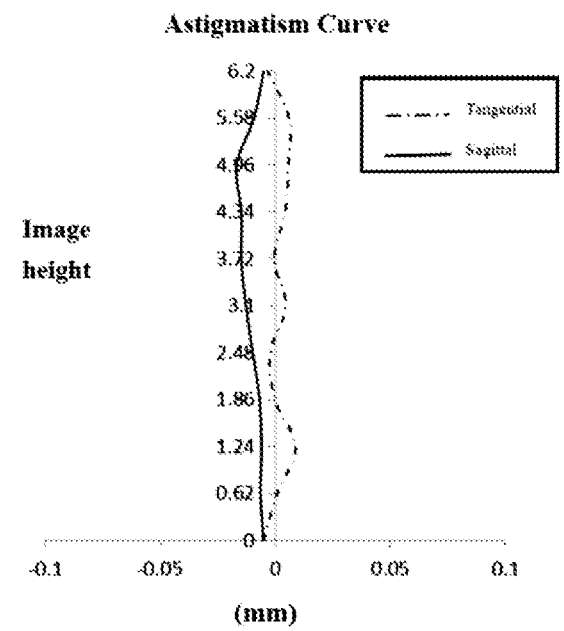
Figure 12C:
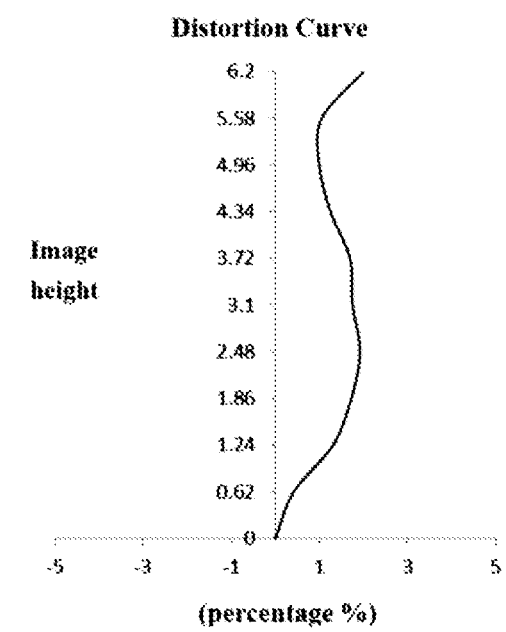
Figure 12D:
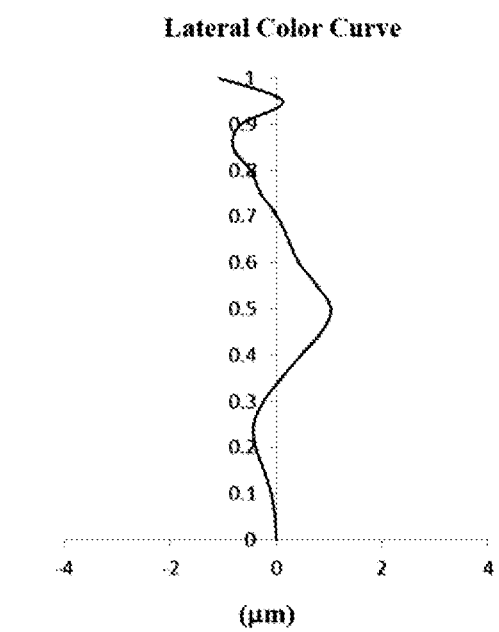

FIG. 12A shows a longitudinal aberration curve of the camera lens according to Embodiment 6, which represents the deviation of the converged focal point after light of different wavelengths passes through the lens assembly. FIG. 12B shows an astigmatism curve of the camera lens according to Embodiment 6, which represents the curvature of the tangential image plane and the curvature of the sagittal image plane. FIG. 12C shows a distortion curve of the camera lens according to Embodiment 6, which represents distortion magnitude values corresponding to different image heights. FIG. 12D shows a lateral color curve of the camera lens according to Embodiment 6, which represents the deviation of different image heights on the imaging plane after light passes through the lens assembly. According to FIGS. 12A to 12D, it can be seen that the camera lens given in Embodiment 6 can achieve good imaging quality.

Embodiment 7

Figure 13:
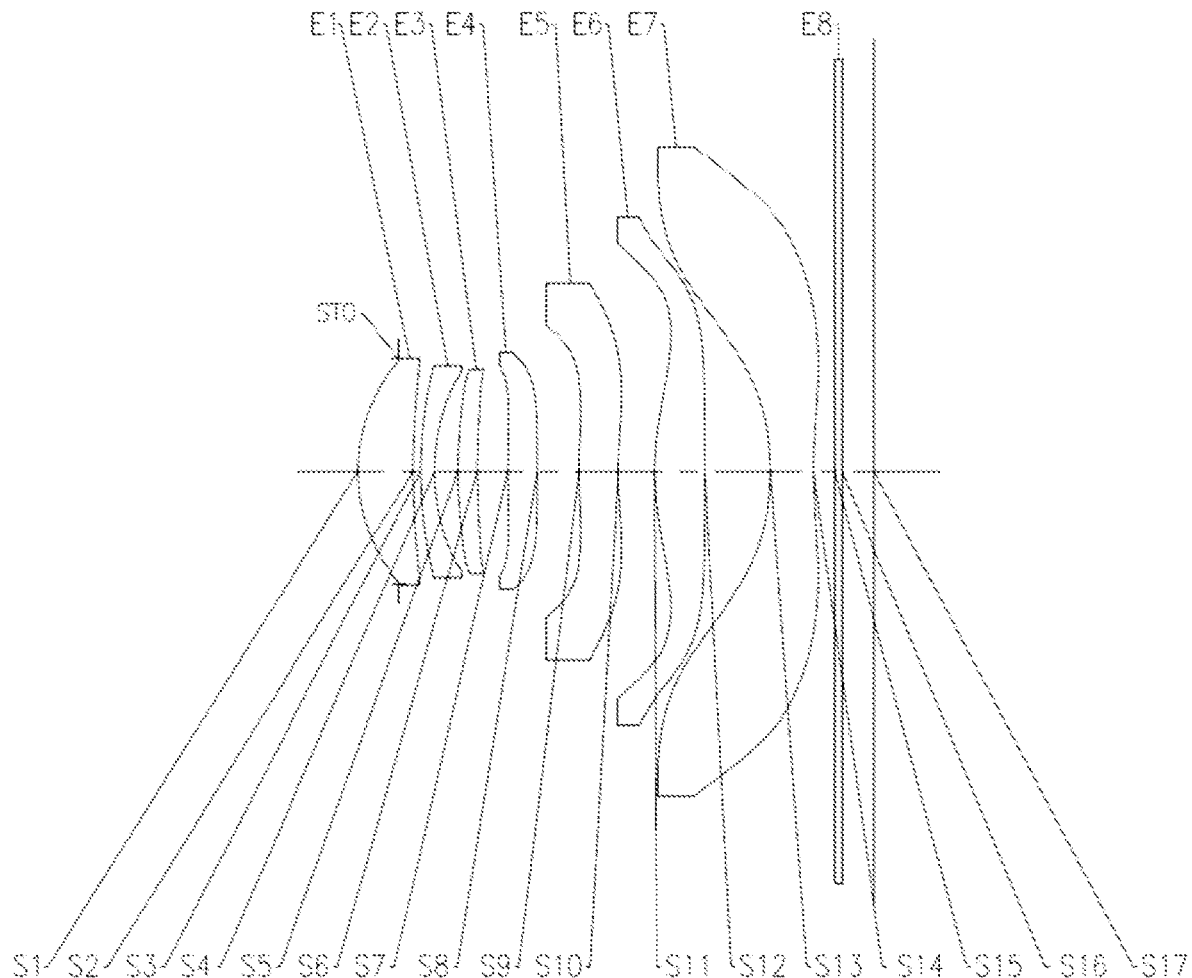
FIG. 13 shows a schematic structural diagram of a camera lens according to Embodiment 7 of the present application.

A camera lens according to Embodiment 7 of the present application will be described below with reference to FIGS. 13 to 14D. FIG. 13 shows a schematic structural diagram of the camera lens according to Embodiment 7 of the present application.

As shown in FIG. 13, the camera lens includes a diaphragm STO, a first lens E1, a second lens E2, a third lens E3, a fourth lens E4, a fifth lens E5, a sixth lens E6, a seventh lens E7, and a filter E8 in order from an object side to an image side along an optical axis.

The first lens E1 has a positive refractive power, and has a convex object side surface S1 and a concave image side surface S2. The second lens E2 has a negative refractive power, and has a convex object side surface S3 and a concave image side surface S4. The third lens E3 has a positive refractive power, and has a convex object side surface S5 and a concave image side surface S6. The fourth lens E4 has a positive refractive power, and has a convex object side surface S7 and a concave image side surface S8. The fifth lens E5 has a negative refractive power, and has a convex object side surface S9 and a concave image side surface S10. The sixth lens E6 has a positive refractive power, and has a convex object side surface S11 and a convex image side surface S12. The seventh lens E7 has a negative refractive power, and has a concave object side surface S13 and a concave image side surface S14. The filter E8 has an object side surface S15 and an image side surface S16. The camera lens has an imaging plane S17. Light from an object sequentially passes through the respective surfaces S1 to S16 and finally forms an image on the imaging plane S17.

In Embodiment 7, an overall effective focal length f of the camera lens has a value of 6.31 mm, an on-axis distance TTL from the object side surface S1 of the first lens E1 to the imaging plane S17 has a value of 7.41 mm, a half ImgH of a diagonal length of an effective pixel region on the imaging plane S17 has a value of 6.20 mm, and the maximum field of view FOV has a value of 87.2°.

Table 13 shows a table of basic parameters of the camera lens of Embodiment 7, wherein the units of the radius of curvature, thickness/distance, and focal length are all millimeters (mm). Table 14 shows higher-order coefficients of each aspherical lens surface that are applicable in Embodiment 7, wherein the surface shape of each aspherical surface can be defined by formula (1) given in Embodiment 1 described above.

TABLE 13

| Surface No. | Surface type | Radius of curvature | Thickness/ distance | Refractive index | Dispersion coefficient | Focal length | Conic coefficient |
|---|---|---|---|---|---|---|---|
| OBJ | Spherical | Infinity | Infinity | | | | |
| STO | Spherical | Infinity | −0.5800 | | | | |
| S1 | Aspherical | 2.4341 | 0.7909 | 1.546 | 56.14 | 5.45 | −0.0997 |
| S2 | Aspherical | 11.7677 | 0.1101 | | | | −6.9333 |
| S3 | Aspherical | 6.2189 | 0.2000 | 1.679 | 19.24 | −9.61 | −11.9814 |
| S4 | Aspherical | 3.1433 | 0.3326 | | | | 1.1102 |
| S5 | Aspherical | 6.8558 | 0.2781 | 1.679 | 19.24 | 36.54 | 12.7134 |
| S6 | Aspherical | 9.3187 | 0.4368 | | | | −27.9746 |
| S7 | Aspherical | 14.7967 | 0.4212 | 1.546 | 56.14 | 35.13 | 78.1695 |
| S8 | Aspherical | 63.9008 | 0.6001 | | | | 66.0864 |
| S9 | Aspherical | 8.1736 | 0.5679 | 1.620 | 25.93 | −22.61 | 5.0281 |
| S10 | Aspherical | 5.0264 | 0.5215 | | | | −1.1723 |
| S11 | Aspherical | 3.8148 | 0.7201 | 1.546 | 56.14 | 6.30 | −0.8191 |
| S12 | Aspherical | −32.9340 | 0.9370 | | | | 67.4798 |
| S13 | Aspherical | −3.7977 | 0.6169 | 1.537 | 55.71 | −4.70 | −0.8707 |
| S14 | Aspherical | 7.9681 | 0.3049 | | | | 1.8235 |
| S15 | Spherical | Infinity | 0.1100 | 1.519 | 64.17 | | |
| S16 | Spherical | Infinity | 0.4613 | | | | |
| S17 | Spherical | Infinity | | | | | |

TABLE 14

| Surface No. | A4 | A6 | A8 | A10 | A12 | A14 | A16 |
|---|---|---|---|---|---|---|---|
| S1 | −2.4067E−03 | −3.5306E−03 | −1.2547E−03 | −3.3079E−04 | −1.1627E−04 | −3.6744E−05 | −1.8361E−05 |
| S2 | −5.8054E−03 | −1.9790E−03 | −4.4703E−04 | −1.7100E−04 | −8.7883E−05 | −6.7019E−06 | 1.6917E−06 |
| S3 | 2.9985E−02 | 7.5125E−04 | −1.1030E−03 | −2.1719E−04 | −8.2122E−05 | 6.0706E−05 | −3.8385E−06 |

TABLE 14-continued

| | | | | | | | |
|---|---|---|---|---|---|---|---|
| S4 | 1.9243E−02 | 5.5410E−03 | −2.4035E−03 | −1.1537E−03 | −4.4824E−04 | −4.6565E−05 | −3.3815E−05 |
| S5 | −4.4245E−02 | 1.1882E−02 | 3.4140E−03 | 7.4271E−04 | 7.4757E−06 | −2.7744E−05 | −7.5765E−06 |
| S6 | −2.2236E−02 | 1.4752E−02 | 5.0095E−03 | 1.5564E−03 | 3.0125E−04 | 9.7821E−05 | 1.6465E−05 |
| S7 | −1.9026E−01 | −1.8218E−02 | −3.8511E−03 | −2.4206E−04 | −3.0852E−04 | 1.2387E−05 | −5.7282E−05 |
| S8 | −2.7545E−02 | −2.5133E−02 | −6.1304E−03 | −1.8879E−04 | −5.7638E−04 | −4.3767E−05 | −9.4941E−05 |
| S9 | −8.2585E−01 | −2.5776E−02 | −1.2580E−02 | 1.0639E−02 | 9.4857E−04 | 1.0785E−03 | 3.4711E−04 |
| S10 | −1.2944E+00 | 1.8105E−01 | −3.6031E−02 | 1.6205E−02 | −5.6784E−03 | 2.6667E−03 | −1.1327E−04 |
| S11 | −2.4947E+00 | 9.2381E−02 | 6.1747E−02 | 5.5072E−02 | 2.4886E−02 | −4.1610E−02 | −6.7547E−03 |
| S12 | −8.2789E−01 | 2.5502E−02 | 1.4926E−01 | −3.5943E−02 | −2.1024E−02 | −1.1554E−02 | 2.9953E−03 |
| S13 | 8.2021E−01 | 4.6172E−01 | −2.5230E−01 | 6.2086E−02 | 3.8458E−03 | −7.4257E−03 | 4.5465E−03 |
| S14 | −4.0902E+00 | 1.3657E−01 | −1.6015E−01 | 4.5166E−02 | −2.1106E−03 | −1.2197E−02 | −1.0756E−02 |

| Surface No. | A18 | A20 | A22 | A24 | A26 |
|---|---|---|---|---|---|
| S1 | −6.1550E−06 | −2.7071E−06 | 0.0000E+00 | 0.0000E+00 | 0.0000E+00 |
| S2 | 1.3888E−07 | 3.8725E−07 | 0.0000E+00 | 0.0000E+00 | 0.0000E+00 |
| S3 | −1.2614E−05 | −3.2717E−06 | 0.0000E+00 | 0.0000E+00 | 0.0000E+00 |
| S4 | −2.7141E−05 | −4.0153E−06 | 0.0000E+00 | 0.0000E+00 | 0.0000E+00 |
| S5 | 5.4314E−06 | 7.3024E−06 | 2.0009E−06 | 8.0165E−07 | 3.7953E−07 |
| S6 | 1.4320E−05 | −2.3406E−06 | 2.4147E−06 | −1.5264E−06 | 1.1816E−06 |
| S7 | 1.0811E−05 | −1.5196E−05 | 2.8265E−06 | −5.2834E−06 | 2.1647E−06 |
| S8 | −2.5892E−06 | −1.3645E−05 | 3.3881E−07 | −2.5727E−06 | −2.9353E−06 |
| S9 | 3.2156E−04 | 4.8169E−05 | −5.0307E−05 | −5.9877E−05 | −2.3321E−05 |
| S10 | 9.6875E−05 | −2.7463E−04 | 6.6303E−06 | 3.0926E−06 | 3.6782E−05 |
| S11 | 1.0175E−03 | 4.2478E−03 | 2.9887E−03 | 1.3757E−03 | 4.6447E−04 |
| S12 | −1.4323E−03 | −2.8034E−03 | −3.3439E−03 | −3.2056E−04 | 5.3791E−04 |
| S13 | 2.5476E−03 | 3.3678E−03 | −1.9991E−03 | 2.3091E−03 | −4.2005E−04 |
| S14 | −1.4403E−02 | −3.9159E−03 | −3.5300E−03 | 1.7705E−03 | −3.2937E−04 |

Figure 14A:
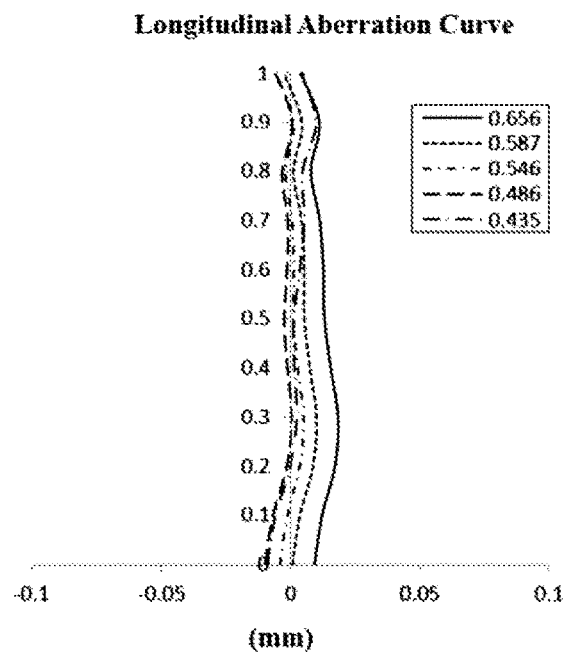
FIGS. 14A to 14D show a longitudinal aberration curve, astigmatism curve, distortion curve and lateral color curve of the camera lens according to Embodiment 7, respectively.
Figure 14B:
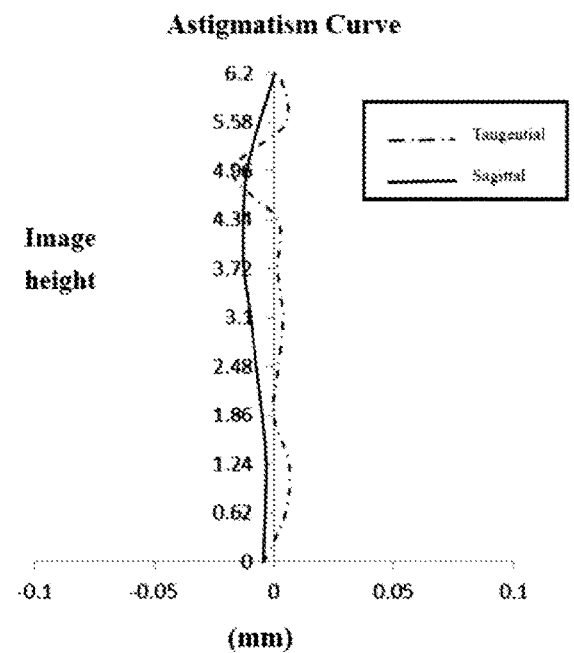
Figure 14C:
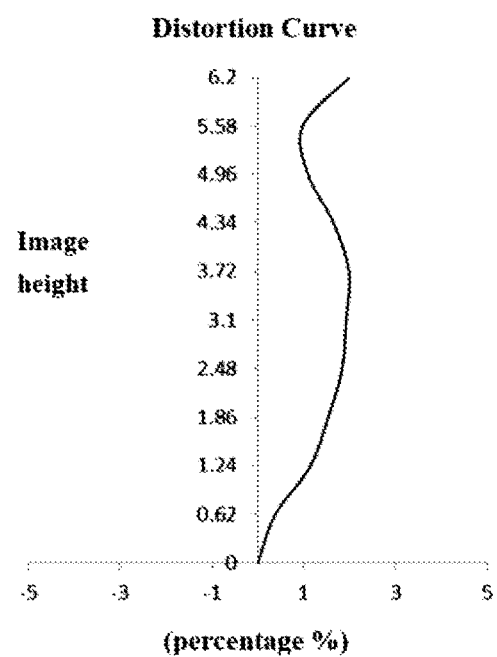
Figure 14D:
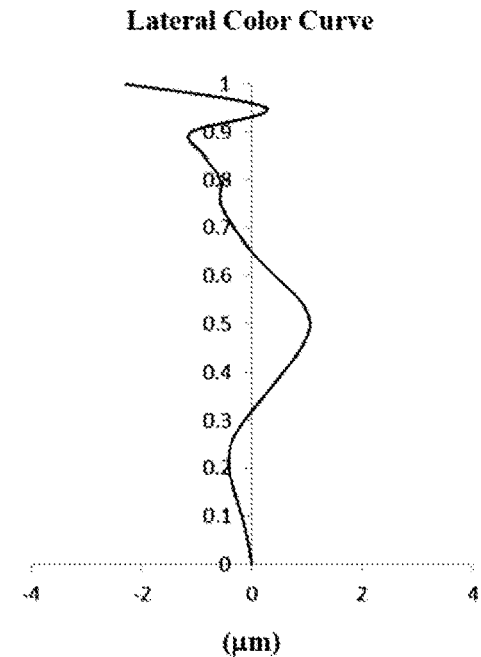

FIG. 14A shows a longitudinal aberration curve of the camera lens according to Embodiment 7, which represents the deviation of the converged focal point after light of different wavelengths passes through the lens assembly. FIG. 14B shows an astigmatism curve of the camera lens according to Embodiment 7, which represents the curvature of the tangential image plane and the curvature of the sagittal image plane. FIG. 14C shows a distortion curve of the camera lens according to Embodiment 7, which represents distortion magnitude values corresponding to different image heights. FIG. 14D shows a lateral color curve of the camera lens according to Embodiment 7, which represents the deviation of different image heights on the imaging plane after light passes through the lens assembly. According to FIGS. 14A to 14D, it can be seen that the camera lens given in Embodiment 7 can achieve good imaging quality.

In summary, Embodiments 1 to 7 satisfy the relationships shown in Table 15, respectively.

The present application further provides an imaging apparatus, which is provided with an electronic photosensitive element to image. The electronic photosensitive element may be a charge-coupled device (CCD) or a complementary metal oxide semiconductor element (CMOS). The imaging apparatus may be an independent imaging apparatus such as a digital camera, or may be an imaging module integrated in a mobile electronic device such as a mobile phone. The imaging apparatus is equipped with the camera lens described above.

The above description is only the preferred embodiments of the present application and the explanation of the applied technical principle. It should be understood by those skilled in the art that the scope of protection involved in the present application is not limited to technical solutions formed by specific combinations of the above technical features, and at the same time, should also cover other technical solutions formed by any combination of the above technical features or equivalent features thereof without departing from the

TABLE 15

| Conditional expression\Embodiment | 1 | 2 | 3 | 4 | 5 | 6 | 7 |
|---|---|---|---|---|---|---|---|
| ImgH$^2$/(TTL × f) | 0.92 | 0.81 | 0.83 | 0.87 | 0.84 | 0.86 | 0.82 |
| f/R9 + f/R10 | 2.73 | 2.59 | 2.68 | 2.65 | 1.99 | 2.61 | 2.03 |
| f6/(R11 + R12) | −0.24 | −0.25 | −0.23 | 0.09 | −0.16 | −0.23 | −0.22 |
| f7/(R13 + R14) | −1.14 | −1.10 | −1.14 | −1.14 | −1.45 | −1.13 | −1.13 |
| f/R1 − f/R4 | 0.83 | 0.64 | 0.96 | 0.76 | 1.30 | 0.69 | 0.58 |
| f12/|R2 − R3| | 3.81 | 1.93 | 1.99 | 3.21 | 2.73 | 2.63 | 1.84 |
| f/(f1 + f2) | −1.32 | −0.80 | −1.70 | −1.38 | −1.10 | −1.40 | −1.52 |
| f5/f7 | 6.06 | 6.04 | 14.27 | 5.19 | 3.02 | 6.01 | 4.81 |
| f/f1 | 1.11 | 1.07 | 1.25 | 1.12 | 1.16 | 1.12 | 1.16 |
| f/f6 | 0.91 | 0.89 | 0.97 | 0.83 | 0.86 | 0.94 | 1.00 |
| f/f6 − f/f7 | 2.19 | 2.18 | 2.31 | 2.11 | 2.05 | 2.25 | 2.34 |
| (T34 + T45)/T34 | 2.59 | 2.86 | 1.80 | 2.49 | 2.84 | 2.45 | 2.37 |
| (R11 − R13)/R14 | 0.99 | 0.98 | 0.98 | 0.96 | 1.08 | 0.98 | 0.96 |
| R13/T67 | −3.45 | −3.27 | −3.87 | −3.18 | −3.20 | −3.72 | −4.05 |
| (CT6 − CT5)/(CT6 − CT7) | 1.04 | 0.91 | 1.60 | 1.27 | 1.86 | 1.00 | 1.47 |
| (SAG71 + T67)/CT6 | −0.79 | −0.59 | −0.94 | −0.56 | −0.50 | −0.79 | −0.93 |
| TTL/ImgH | 1.13 | 1.21 | 1.18 | 1.16 | 1.21 | 1.17 | 1.20 | concept of the present application. For example, the above features and (but not limited to) the technical features with similar functions disclosed in the present application are replaced with each other to form technical solutions.

The invention claimed is:

1. A camera lens, comprising, in order from an object side to an image side along an optical axis:
a first lens having a positive refractive power;
a second lens having a negative refractive power;
a third lens;
a fourth lens;
a fifth lens;
a sixth lens having a positive refractive power; and
a seventh lens having a negative refractive power;
wherein a total effective focal length f of the camera lens, a half ImgH of a diagonal length of an effective pixel region on an imaging plane of the camera lens, and a distance TTL from an object side surface of the first lens to the imaging plane of the camera lens on the optical axis satisfy: $ImgH^2/(TTL \times f) \geq 0.8$; and
the total effective focal length f of the camera lens, a radius of curvature R9 of an object side surface of the fifth lens, and a radius of curvature R10 of an image side surface of the fifth lens satisfy: $1.9 \leq f/R9+f/R10<3.0$.

2. The camera lens according to claim 1, wherein an effective focal length f6 of the sixth lens, a radius of curvature R11 of an object side surface of the sixth lens, and a radius of curvature R12 of an image side surface of the sixth lens satisfy: $-0.5<f6/(R11+R12) \leq 0.1$.

3. The camera lens according to claim 1, wherein an effective focal length f7 of the seventh lens, a radius of curvature R13 of an object side surface of the seventh lens, and a radius of curvature R14 of an image side surface of the seventh lens satisfy: $-1.5 \leq f7/(R13+R14)<-1.0$.

4. The camera lens according to claim 1, wherein the total effective focal length f of the camera lens, a radius of curvature R1 of the object side surface of the first lens, and a radius of curvature R4 of an image side surface of the second lens satisfy: $0.5<f/R1-f/R4<1.5$.

5. The camera lens according to claim 1, wherein a combined focal length f12 of the first lens and the second lens, a radius of curvature R2 of an image side surface of the first lens, and a radius of curvature R3 of an object side surface of the second lens satisfy: $1.8 \leq f12/|R2-R3|<4.0$.

6. The camera lens according to claim 1, wherein the total effective focal length f of the camera lens, an effective focal length f1 of the first lens, and an effective focal length f2 of the second lens satisfy: $-2.0<f/(f1+f2) \leq -0.8$.

7. The camera lens according to claim 1, wherein an effective focal length f5 of the fifth lens and an effective focal length f7 of the seventh lens satisfy: $3 \leq f5/f7<15$.

8. The camera lens according to claim 1, wherein the total effective focal length f of the camera lens and an effective focal length f1 of the first lens satisfy: $1 \leq f/f1 \leq 1.3$.

9. The camera lens according to claim 1, wherein the total effective focal length f of the camera lens and an effective focal length f6 of the sixth lens satisfy: $0.8 \leq f/f6 \leq 1.0$.

10. The camera lens according to claim 1, wherein the total effective focal length f of the camera lens, an effective focal length f6 of the sixth lens, and an effective focal length f7 of the seventh lens satisfy: $2 \leq f/f6-f/f7<2.5$.

11. The camera lens according to claim 1, wherein a separation distance T34 between the third lens and the fourth lens on the optical axis, and a separation distance T45 between the fourth lens and the fifth lens on the optical axis satisfy: $1.8 \leq (T34+T45)/T34<3.0$.

12. The camera lens according to claim 1, wherein a radius of curvature R11 of an object side surface of the sixth lens, a radius of curvature R13 of an object side surface of the seventh lens, and a radius of curvature R14 of an image side surface of the seventh lens satisfy: $0.9 \leq (R11-R13)/R14<1.2$.

13. The camera lens according to claim 1, wherein a radius of curvature R13 of an object side surface of the seventh lens, and a separation distance T67 between the sixth lens and the seventh lens on the optical axis satisfy: $-4.5<R13/T67<-3.0$.

14. The camera lens according to claim 1, wherein a center thickness CT5 of the fifth lens on the optical axis, a center thickness CT6 of the sixth lens on the optical axis, and a center thickness CT7 of the seventh lens on the optical axis satisfy: $0.9 \leq (CT6-CT5)/(CT6-CT7)<2.0$.

15. The camera lens according to claim 1, wherein an on-axis distance SAG71 from an intersection point of an object side surface of the seventh lens and the optical axis to a vertex of the maximum effective radius of the object side surface of the seventh lens, a separation distance T67 between the sixth lens and the seventh lens on the optical axis, and a center thickness CT6 of the sixth lens on the optical axis satisfy: $-1.0 \leq (SAG71+T67)/CT6 \leq -0.5$.

16. The camera lens according to claim 1, wherein a distance TTL from the object side surface of the first lens to an imaging plane of the camera lens on the optical axis and a half ImgH of a diagonal length of an effective pixel region on the imaging plane satisfy: $TTL/ImgH<1.3$.

17. A camera lens, comprising, in order from an object side to an image side along an optical axis:
a first lens having a positive refractive power;
a second lens having a negative refractive power;
a third lens;
a fourth lens;
a fifth lens;
a sixth lens having a positive refractive power; and
a seventh lens having a negative refractive power;
wherein a total effective focal length f of the camera lens, a half ImgH of a diagonal length of an effective pixel region on an imaging plane of the camera lens, and a distance TTL from an object side surface of the first lens to the imaging plane of the camera lens on the optical axis satisfy: $ImgH^2/(TTL \times f) \geq 0.8$; and
an effective focal length f7 of the seventh lens, a radius of curvature R13 of an object side surface of the seventh lens, and a radius of curvature R14 of an image side surface of the seventh lens satisfy: $-1.5 \leq f7/(R13+R14)<-1.0$.

18. The camera lens according to claim 17, wherein an effective focal length f6 of the sixth lens, a radius of curvature R11 of an object side surface of the sixth lens, and a radius of curvature R12 of an image side surface of the sixth lens satisfy: $-0.5<f6/(R11+R12) \leq 0.1$.

19. The camera lens according to claim 18, wherein the total effective focal length f of the camera lens, a radius of curvature R9 of an object side surface of the fifth lens, and a radius of curvature R10 of an image side surface of the fifth lens satisfy: $1.9 \leq f/R9+f/R10<3.0$.

20. The camera lens according to claim 17, wherein the total effective focal length f of the camera lens, a radius of curvature R1 of the object side surface of the first lens, and a radius of curvature R4 of an image side surface of the second lens satisfy: $0.5<f/R1-f/R4<1.5$.

* * * * *